US012016028B2

(12) United States Patent
Luo et al.

(10) Patent No.: US 12,016,028 B2
(45) Date of Patent: Jun. 18, 2024

(54) SUPPORTING ALLOCATION MODIFICATION DURING TRANSITION INSTANCE IN INTEGRATED ACCESS AND BACKHAUL NETWORK

(71) Applicant: QUALCOMM Incorporated, San Diego, CA (US)

(72) Inventors: Jianghong Luo, Skillman, NJ (US); Navid Abedini, Basking Ridge, NJ (US); Tao Luo, San Diego, CA (US); Luca Blessent, Whitehouse Station, NJ (US); Junyi Li, Franklin Park, NJ (US); Karl Georg Hampel, Hoboken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 17/201,376

(22) Filed: Mar. 15, 2021

(65) Prior Publication Data

US 2021/0298064 A1    Sep. 23, 2021

Related U.S. Application Data

(60) Provisional application No. 62/992,102, filed on Mar. 19, 2020.

(51) Int. Cl.
*H04W 76/27* (2018.01)
*H04L 1/1607* (2023.01)
(Continued)

(52) U.S. Cl.
CPC ........... *H04W 72/23* (2023.01); *H04L 1/1607* (2013.01); *H04W 72/21* (2023.01); *H04W 76/27* (2018.02)

(58) Field of Classification Search
CPC .............................. H04W 72/14; H04W 76/27
See application file for complete search history.

(56) References Cited

U.S. PATENT DOCUMENTS

2016/0095104 A1    3/2016  Chen et al.
2016/0345355 A1    11/2016 Andersson et al.
(Continued)

FOREIGN PATENT DOCUMENTS

CN    109906570 A    6/2019
EP    2809025 A1     12/2014

OTHER PUBLICATIONS

Huawei, et al., "On Frame Structure of IAB", 3GPP Draft, R1-1810132, 3GPP TSG RAN WG1 Meeting #94bis, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051517547, 8 Pages, Retrieved from the Internet: URL:http://www.3gpp.org/ftp/tsg%5Fran/WG1%5FRL1/TSGR1%5F94b/Docs/R1%2D1810132%2Ezip [retrieved on Sep. 29, 2018] Section 2.

(Continued)

*Primary Examiner* — Michael T Vu
(74) *Attorney, Agent, or Firm* — Procopio, Cory, Hargreaves & Savitch LLP/QUALCOMM Incorporated

(57) ABSTRACT

Aspects presented herein may enable an IAB node to modify a resource allocation or change one or more parameters related to the resource allocation when the IAB node detects that the resource allocation overlaps with guard symbols or another resource allocation. In one aspect, an IAB node determines that a first channel allocation will be punctured based on an overlap of the first channel allocation with at least one of a guard symbol or a second channel allocation. The IAB node uses, for the first channel allocation or the second channel allocation, one or more of a modified (Continued)

parameter or a modified grant in response to determining that the first channel allocation will be punctured.

56 Claims, 21 Drawing Sheets

(51) Int. Cl.
*H04W 72/21* (2023.01)
*H04W 72/23* (2023.01)

(56) References Cited

U.S. PATENT DOCUMENTS

| | | | |
|---|---|---|---|
| 2017/0078058 A1* | 3/2017 | Marinier | H04W 72/042 |
| 2018/0279149 A1 | 9/2018 | Li et al. | |
| 2019/0158263 A1 | 5/2019 | Lee et al. | |
| 2019/0349079 A1 | 11/2019 | Novlan et al. | |
| 2021/0144705 A1* | 5/2021 | Li | H04W 28/0215 |
| 2021/0176758 A1* | 6/2021 | Bae | H04L 1/1864 |
| 2021/0274551 A1* | 9/2021 | Takata | H04W 74/0816 |
| 2022/0330176 A1* | 10/2022 | Kowalski | H04W 52/325 |

OTHER PUBLICATIONS

International Search Report and Written Opinion—PCT/US2021/022581—ISA/EPO—dated May 27, 2021.

* cited by examiner

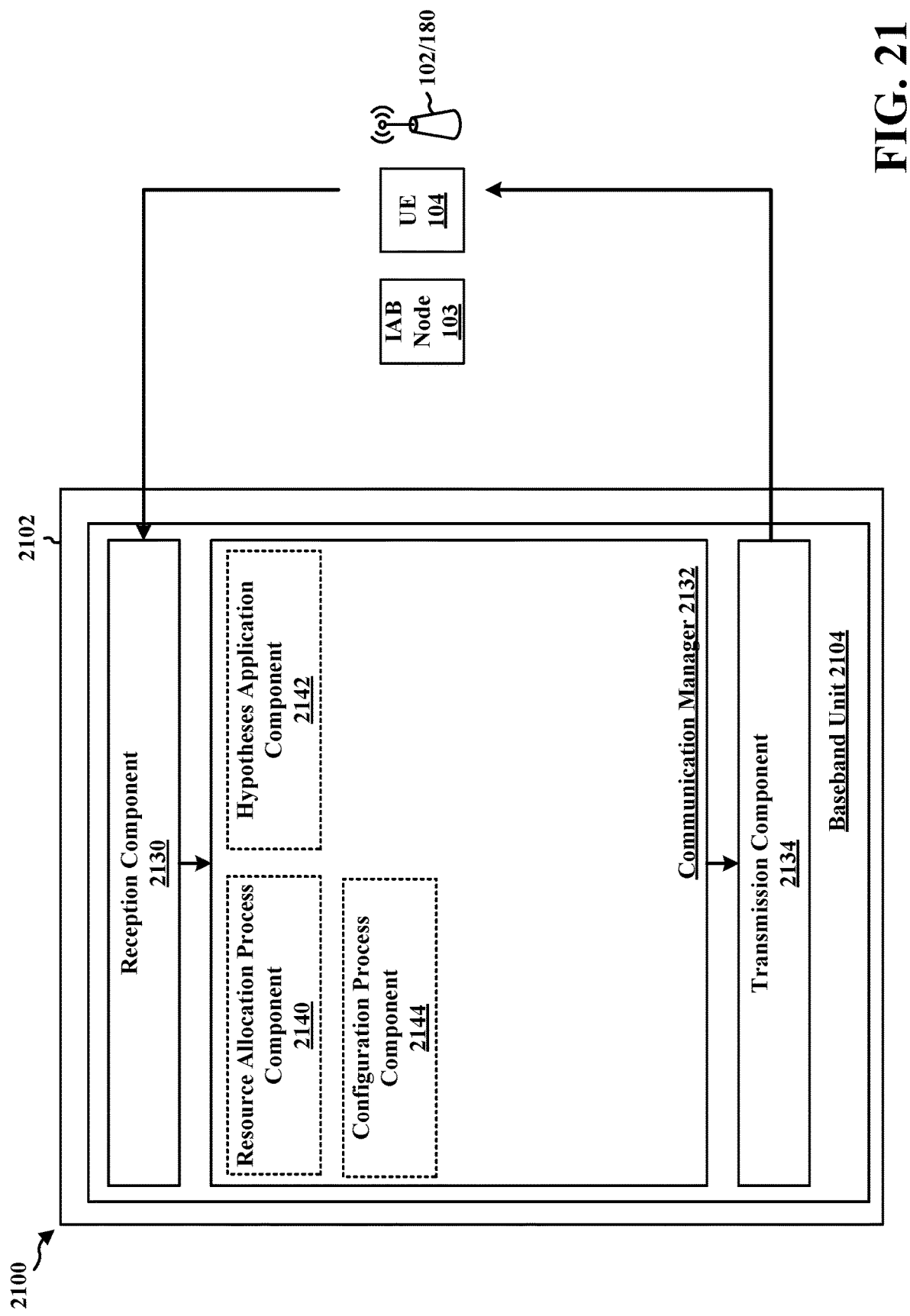

SUPPORTING ALLOCATION MODIFICATION DURING TRANSITION INSTANCE IN INTEGRATED ACCESS AND BACKHAUL NETWORK

CROSS REFERENCE TO RELATED APPLICATION(S)

This application claims the benefit of priority of Provisional Application Ser. No. 62/992,102, entitled "SUPPORTING ALLOCATION MODIFICATION DURING TRANSITION INSTANCE IN AN INTEGRATED ACCESS AND BACKHAUL NETWORK" and filed on Mar. 19, 2020, which is expressly incorporated by reference herein in its entirety.

INTRODUCTION

The present disclosure relates generally to communication systems, and more particularly, to an integrated access and backhaul (IAB) network.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects presented herein provide improvements for wireless communication that may be applicable to various multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method is provided for wireless communication at an integrated access and backhaul (IAB) node. The method includes determining a first channel allocation from a parent device of the apparatus to the apparatus will be punctured based at least in part on an overlap of the first channel allocation with at least one of a guard symbol provided by the parent node of the apparatus or a second channel allocation from the apparatus to a child device of the apparatus. The method further includes using, for the first channel allocation, one or more of a modified parameter or a modified grant in response to determining the first channel allocation will be punctured.

In another aspect of the disclosure, an apparatus for wireless communication at an IAB node is provided. The apparatus includes means for determining a first channel allocation from a parent device of the apparatus to the apparatus will be punctured based at least in part on an overlap of the first channel allocation with at least one of a guard symbol provided by the parent node of the apparatus or a second channel allocation from the apparatus to a child device of the apparatus. The apparatus includes means for using, for the first channel allocation, one or more of a modified parameter or a modified grant in response to determining the first channel allocation will be punctured.

In another aspect of the disclosure, an apparatus for wireless communication at an IAB node is provided. The apparatus includes a memory and at least one processor coupled the memory. The memory and at least one processor are configured to determine a first channel allocation from a parent device of the apparatus to the apparatus will be punctured based at least in part on an overlap of the first channel allocation with at least one of a guard symbol provided by the parent node of the apparatus or a second channel allocation from the apparatus to a child device of the apparatus. The memory and at least one processor may further be configured to use, for the first channel allocation, one or more of a modified parameter or a modified grant in response to determining the first channel allocation will be punctured.

In another aspect of the disclosure, a non-transitory computer-readable storage medium storing computer executable code for wireless communication at a UE is provided. The code when executed by a processor causes the processor to determine a first channel allocation from a parent device of the apparatus to the apparatus will be punctured based at least in part on an overlap of the first channel allocation with at least one of a guard symbol provided by the parent node of the apparatus or a second channel allocation from the apparatus to a child device of the apparatus. The code may further cause the processor to use, for the first channel allocation, one or more of a modified parameter or a modified grant in response to determining the first channel allocation will be punctured.

In an aspect of the disclosure, a method is provided for wireless communication at an IAB node. The method includes receiving an allocation for communication from a first device. The method further includes receiving the communication based at least in part on multiple hypotheses including a first hypothesis that is based at least in part on an unmodified allocation and a second hypothesis that is based at least in part on a modified allocation associated with an overlap in resources allocated to the first device with one or more of guard symbols for the first device or with another allocation of the wireless device.

In another aspect of the disclosure, an apparatus for wireless communication at an IAB node is provided. The apparatus includes means for receiving an allocation for communication from a first device. The apparatus includes means for receiving the communication based at least in part on multiple hypotheses including a first hypothesis that is based at least in part on an unmodified allocation and a second hypothesis that is based at least in part on a modified allocation associated with an overlap in resources allocated to the first device with one or more of guard symbols for the first device or with another allocation of the wireless device.

In another aspect of the disclosure, an apparatus for wireless communication at an IAB node is provided. The apparatus includes a memory and at least one processor coupled the memory. The memory and at least one processor are configured to receive an allocation for communication from a first device. The memory and at least one processor may further be configured to receive the communication based at least in part on multiple hypotheses including a first hypothesis that is based at least in part on an unmodified allocation and a second hypothesis that is based at least in part on a modified allocation associated with an overlap in resources allocated to the first device with one or more of guard symbols for the first device or with another allocation of the wireless device.

In another aspect of the disclosure, a non-transitory computer-readable storage medium storing computer executable code for wireless communication at a UE is provided. The code when executed by a processor causes the processor to receive an allocation for communication from a first device. The code may further cause the processor to receive the communication based at least in part on multiple hypotheses including a first hypothesis that is based at least in part on an unmodified allocation and a second hypothesis that is based at least in part on a modified allocation associated with an overlap in resources allocated to the first device with one or more of guard symbols for the first device or with another allocation of the wireless device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 21 is a diagram illustrating an example of a hardware implementation for an example apparatus in accordance with aspects presented herein.

DETAILED DESCRIPTION

Figure 1:
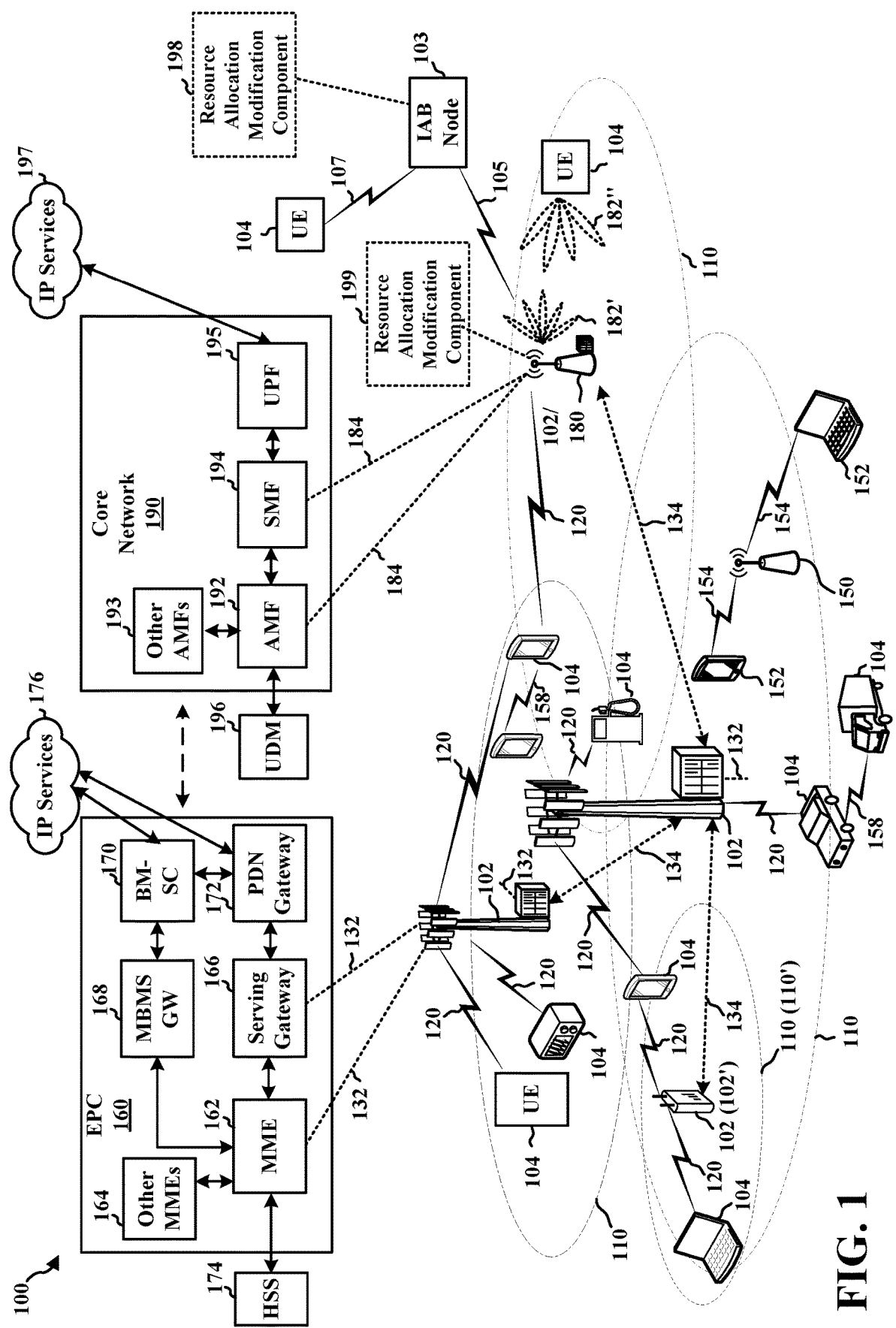
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

An IAB node may transition from communicating with a parent IAB node using a mobile termination (MT) function to communicating with a child IAB node using a distributed unit (DU) function. Thus, the IAB node includes different functions, e.g., an MT function and a DU function, for communicating with a parent node and a child node. The IAB node may communicate with the parent IAB node and the child IAB node in a time division multiplexing (TDM) manner so that the IAB node transitions between using the MT function and the DU function. At times, a first allocation for one function (e.g., the MT function or the DU function) of the IAB node may at least partially overlap a second allocation for the IAB node or guard symbol(s) for the other function in one or more examples. Resources for one of the allocations may be punctured based on the overlap. Aspects presented herein enable wireless devices involved in such communication to modify parameters of communication and/or a grant of resources based on the overlap. The modification may reduce resources being punctured, thereby improving the reliability of the communication.

For example, a wireless device, such as an IAB node, may determine that a first channel allocation will be punctured based at least in part on an overlap of the first channel allocation with at least one of a guard symbol or a second channel allocation. The wireless device (e.g., IAB node) may then use a modified parameter and/or a modified grant for the first channel allocation in response to determining that the first channel allocation will be punctured.

A wireless device receiving communication from an IAB node, for example, may receive an allocation for communication from the IAB node and use multiple hypotheses (e.g., a set of rule(s) or configuration(s)) to receive the communication from the IAB node. A first hypothesis may be based at least in part on an unmodified allocation, and a second hypothesis may be based at least in part on a modified allocation associated with an overlap in resources allocated to the wireless device with one or more of guard symbols for the wireless device or with another allocation of the wireless device. For example, the wireless device may receive the communication based on a first configuration that does not modify the allocation of the communication, and the wireless device may receive the communication based on a second configuration that modifies the allocation of the communication (e.g., based on one or more guard symbols and/or an overlapping with another wireless device). Based on the reception of the communication using the first configuration and the second configuration, the wireless device may determine which configuration to use or not to use. For example, the wireless device may determine not to apply a configuration that may result in a resource puncturing.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Guard symbols may be provided at transition instances for an IAB node, such as transition between operation based on a mobile termination (MT) and a distributed unit (DU) of the IAB node. For example, if an IAB node is receiving a downlink transmission from a parent IAB node, one or more guard symbols may be provided between the downlink reception at the IAB (e.g., at the MT) to switch to downlink transmission to a child IAB node (e.g., by the DU of the IAB node). The guard symbol(s) may provide time for a component switch, e.g., between reception and transmission, for an analog beam switch, etc. Different switch types may be provided for different types of transitions. The number of guard symbols preferred by a child node may be different than the actual number of guard symbols provided by the parent node. The parent node may not have all of the information about a transition instance at the child node. The parent node may attempt to identify potential transition instances.

Aspects presented herein enable an IAB node to address an overlap between guard symbols for a transition instance and a channel, or signal, allocation. The channel allocation may include a periodic or semi-static channel allocation, and some of the periodic/semi-static resources may overlap with a transition instance. As presented herein, the IAB node may modify the allocation and/or a related configuration parameter in response to determining an overlap with the guard symbols.

Aspects presented herein may enable an IAB node to receive communication in which one or more symbols of the allocated resources are discarded or punctured associated with overlap with a transition instance. For example, an IAB node may attempt to receive the communication based at least in part on multiple hypotheses. A first hypothesis may be based at least in part on an unmodified allocation, and a second hypothesis may be based at least in part on a modified allocation associated with an overlap in resources allocated to the first device with one or more of guard symbols for the first device or with another allocation of the wireless device.

Figure 4:
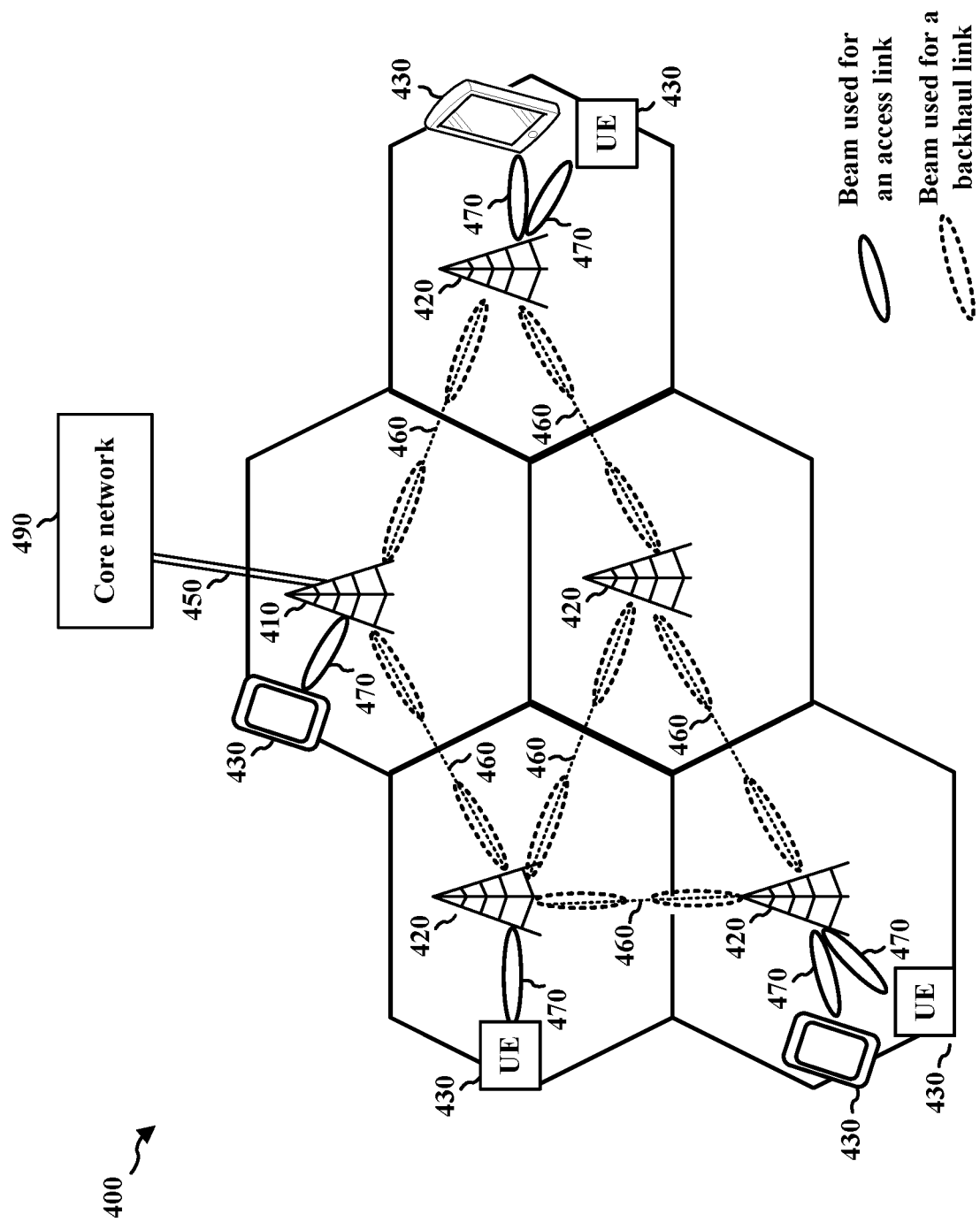
FIG. 4 is a diagram illustrating an example of an IAB network.

FIG. 1 is a diagram illustrating an example of a wireless communications system and an access network 100. FIG. 1 illustrates that a communication system may include an IAB network that includes IAB nodes, such as an IAB node or an IAB donor. FIG. 4 illustrates an example IAB network. FIG. 1 illustrates a base station 102/180 as an IAB donor that provides a link to a core network, such as core network 190 or EPC 160, to an IAB node 103 via a wireless backhaul link 105. Thus, the base station 102/180 may function as an IAB donor node to the IAB node 103. The IAB node 103 may provide a wireless access link 107 to one or more UEs 104 and/or to other IAB nodes, as described in connection with FIG. 4. In one aspect, the IAB node 103 may include a resource allocation modification component 198 that determines a first channel allocation will be punctured based at least in part on an overlap of the first channel allocation with at least one of a guard symbol or a second channel allocation and uses, for the first channel allocation, a modified parameter and/or a modified grant in response to determining the first channel allocation will be punctured. In another aspect, the resource allocation modification component 198 may receive an allocation for communication from a first device, and the resource allocation modification component 198 may receive the communication based at least in part on multiple hypotheses including a first hypothesis that is based at least in part on an unmodified allocation and a second hypothesis that is based at least in part on a modified allocation associated with an overlap in resources allocated to the first device with one or more of guard symbols for the first device or with another allocation of the wireless device.

A parent IAB node, such as the base station 102/180 may include a resource allocation modification component 199 configured to determine a first channel allocation of a child node will be punctured at the child node based at least in part on an overlap of the first channel allocation with at least one of a guard symbol or a second channel allocation of the child node and exchange communication with the child node using one or more of a modified parameter or a modified grant in response to determining the first channel allocation will be punctured at the child node. Although the following description may be focused on 5G NR, the concepts described herein may be applicable to other similar areas, such as LTE, LTE-A, CDMA, GSM, and other wireless technologies.

The wireless communications system in FIG. 1 (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6

GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provide s bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2B:
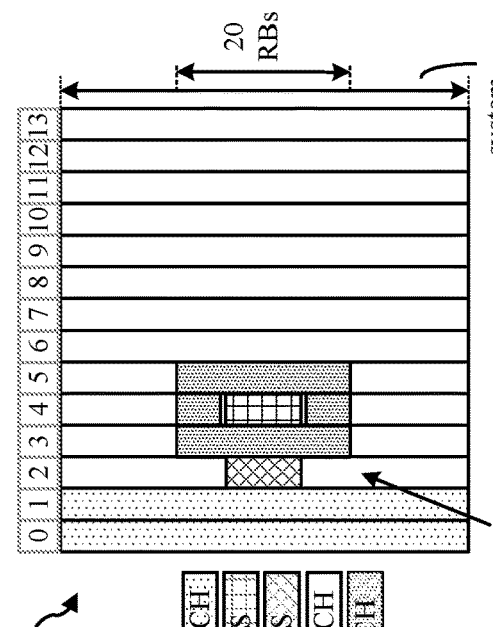
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.
Figure 2D:
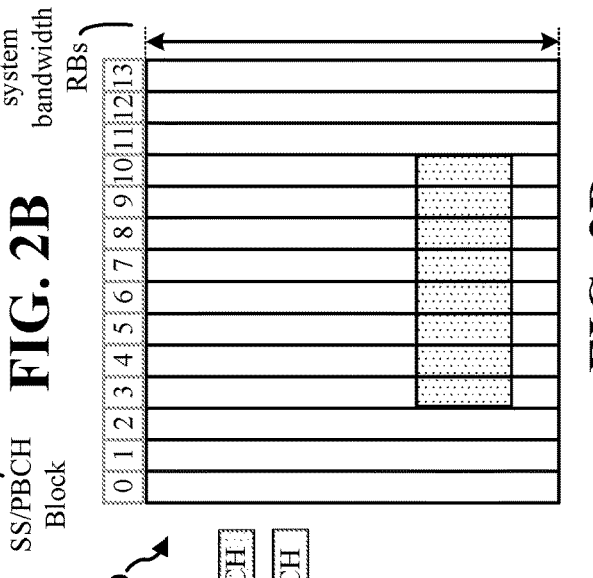
Figure 2A:
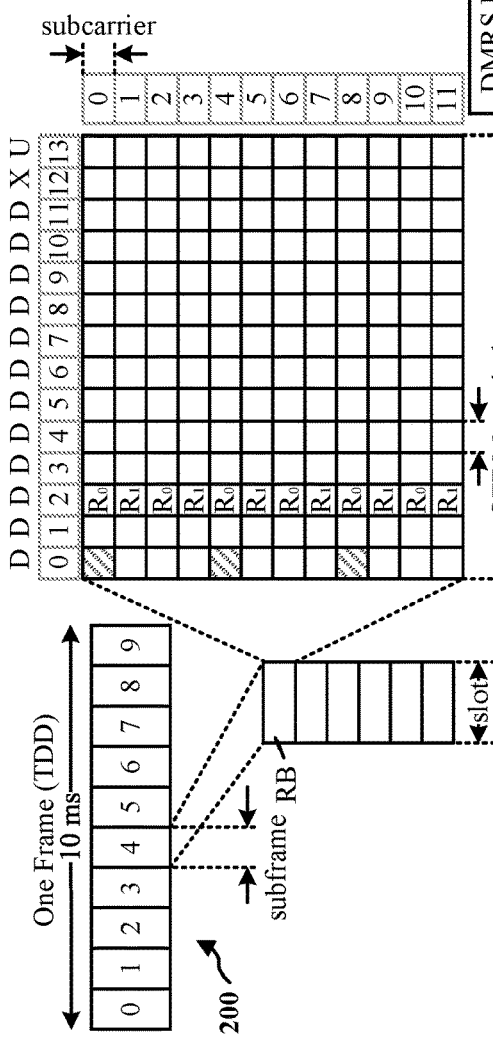
Figure 2C:
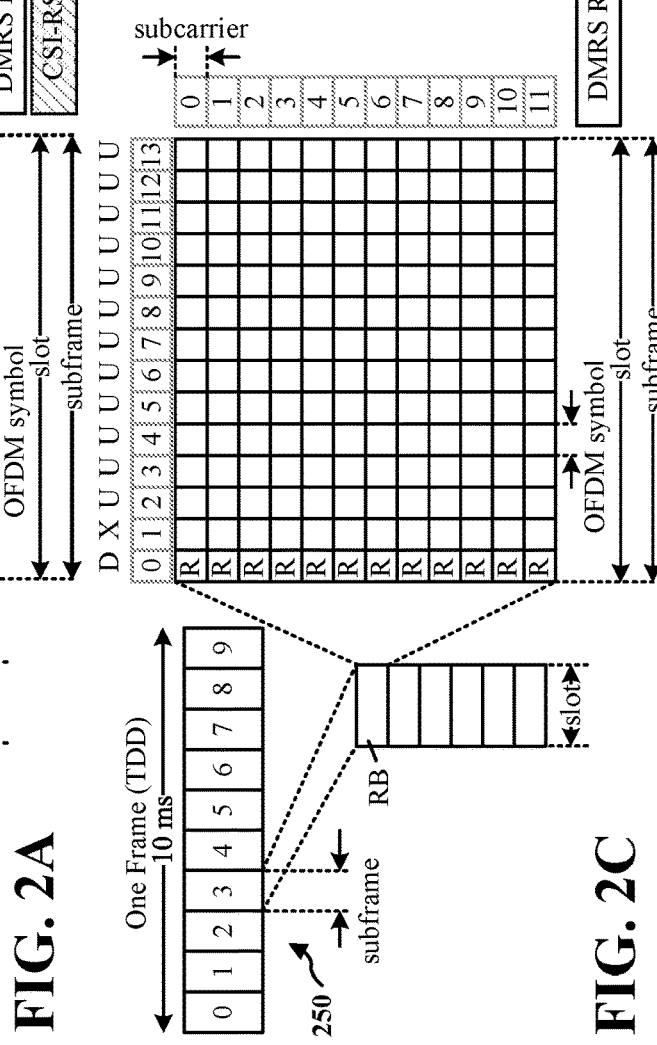

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
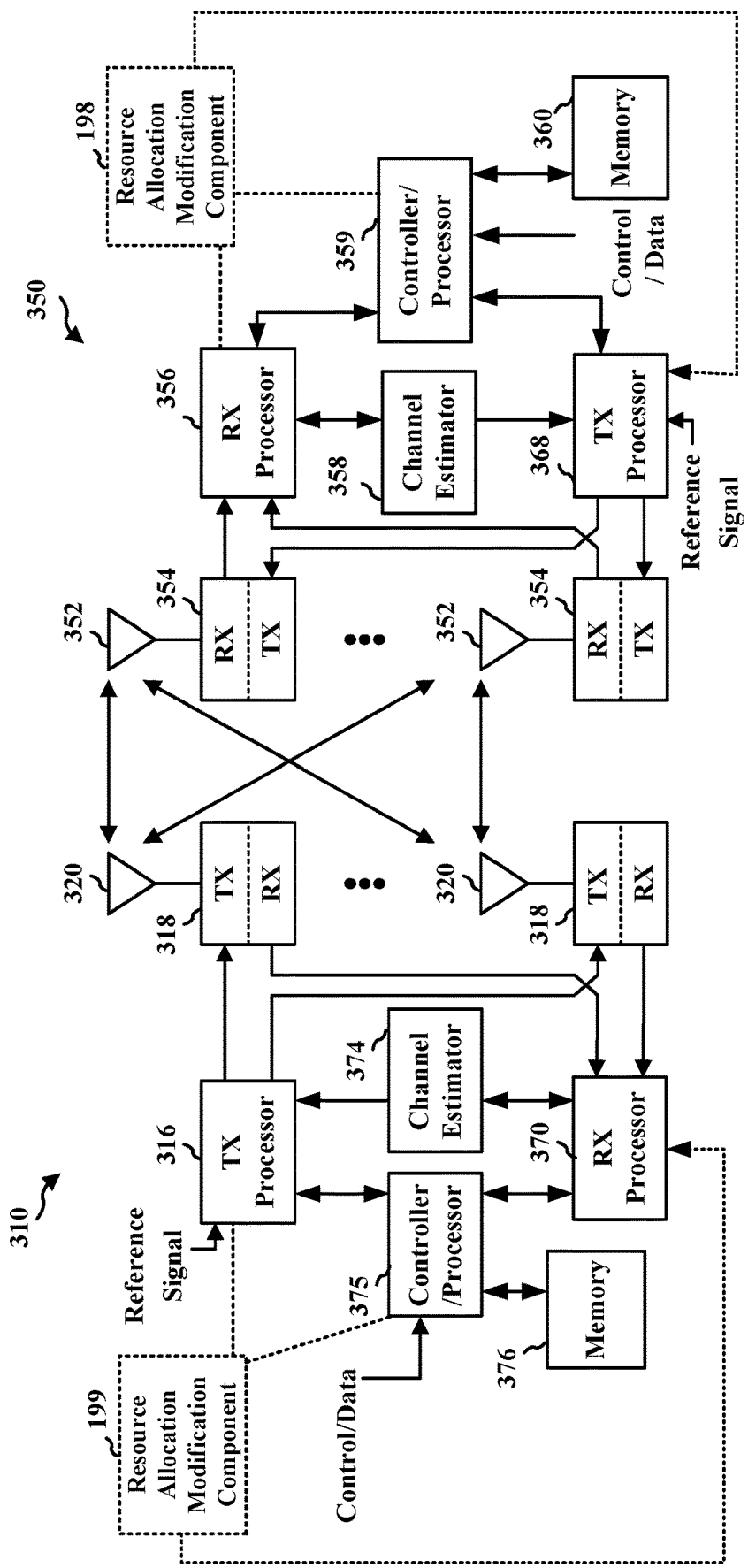
FIG. 3 is a diagram illustrating an example of an IAB node and a wireless device in an access network.

FIG. 3 is a block diagram of a first wireless communication device 310 in communication with a second wireless communication device 350 in an IAB network. The device 310 may comprise a parent node, and the device 350 may include a child node. In another example, the device 310 may be an IAB node, and the device 350 may be a wireless device that has an access link with the IAB node. For example, the device 310 may be an IAB node, and the device 350 may be a UE. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 316, the RX processor 370, and the controller/processor 375 may include a resource allocation modification component 199 that is configured to perform aspects described in connection with FIG. 1.

At least one of the TX processor 368, the RX processor 356, and the controller/processor 359 may include a resource allocation modification component 198 that is configured to perform aspects described in connection with FIG. 1.

FIG. 4 is a diagram illustrating an integrated access and backhaul (IAB) network 400. The IAB network 400 may include an anchor node (that may be referred to herein as an "IAB donor") 410 and access nodes (that may be referred to herein as "IAB nodes") 420. The IAB donor 410 may be a base station, such as a base station 102 or 180 described in connection with FIG. 1, and may perform functions to control the IAB network 400. The IAB donor 410 provides a wireline connection to a core network 490. The IAB nodes 420 may comprise L2 relay nodes, etc., that relay traffic between the IAB donor 410 and other IAB nodes or UEs. Together, the IAB donor 410 and the IAB nodes 420 share resources to provide an access network and a backhaul network to the core network 490. For example, resources may be shared between access links and backhaul links in the IAB network.

One or more UEs 430 may interface with the IAB nodes 420 or the IAB donor 410 through access links 470. The IAB nodes 420 communicate with each other and with the IAB donor 410 through backhaul links 460. The IAB donor 410 is connected to the core network 490 via a wireline backhaul link 450. The UEs 430 may communicate with the core network 490 by relaying messages through their respective access link 470 to the IAB network 400, which then may relay the message through backhaul links 460 to the IAB donor 410 to communicate to the core network 490 through the wireline backhaul link 450. Similarly, the core network may communicate with a UE 430 by sending a message to the IAB donor 410 through the wireline backhaul link 450. The IAB donor 410 sends the message through the IAB network 400 via backhaul links 460 to the IAB node 420 connected to the one or more UEs 430, and the IAB node 420 sends the message to the one or more UEs 430 via the access link 470.

Figure 5:
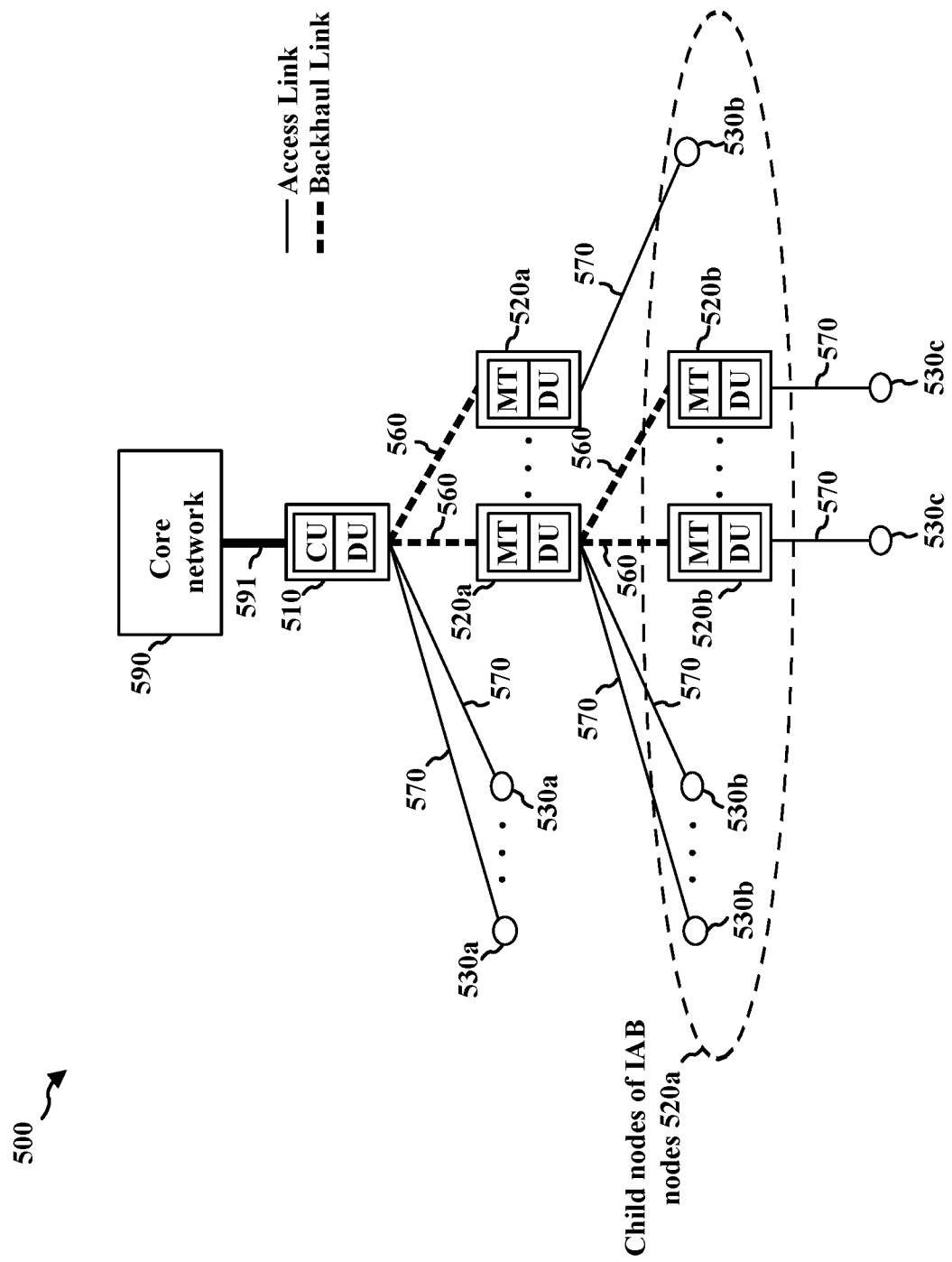
FIG. 5 is a diagram illustrating an example of an IAB network and components thereof.

FIG. 5 is a diagram illustrating another example of an IAB network 500 and components thereof. The IAB network 500 includes an IAB donor 510 and IAB nodes 520a and 520b. The IAB nodes 520a and 520b, as well as the IAB donor 510, may provide wireless access links 570 to UEs 530a and 530b respectively.

The IAB donor 510 may be considered a root node of the tree structure of the IAB network 500. The IAB donor node 510 may be connected to the core network 590 via a wired connection 591. The wired connection may comprise, e.g., a wireline fiber. For example, the IAB donor node 510 may provide a connection to one or more IAB nodes 520a. The IAB nodes 520a may each be referred to as a child node of the IAB donor node 510. The IAB donor node 510 may also provide a connection to one or more UE 530a, which may be referred to as a child UE of the IAB donor 510. The IAB donor 510 may be connected to its child IAB nodes 520a via backhaul links 560, and may be connected to the child UEs 530a via access links 570. The IAB nodes 520a that are children nodes of IAB node 510 may also have IAB node(s) 520b and/or UE(s) 530b as children. For example, IAB nodes 520b may further connect to child nodes and/or child UEs. FIG. 5 illustrates IAB nodes 520b providing an access link to UEs 530c, respectively.

The IAB donor 510 may include a central unit (CU) and a distributed unit (DU). The central unit CU may provide control for the IAB nodes 520a, 520b in the IAB network 500. For example, the CU may be responsible for configuration of the IAB network 500. The CU may perform RRC/PDCP layer functions. The DU may perform scheduling. For example, the DU may schedule resources for communication by the child IAB nodes 520a and/or UEs 530a of the IAB donor 510.

The IAB nodes 520a, 520b may include a mobile termination (MT) and a DU. The MT of IAB node 520a may operate as a scheduled node, scheduled similar to a UE 530a by the DU of the parent node, e.g., IAB donor 510. The MT of IAB node 520b may operate as a scheduled node of parent node 520a. The DU may schedule the child IAB nodes 520b and UEs 530b of the IAB node 520a. As an IAB node may provide a connection to an IAB node that in turn provides a connection for another IAB node, the pattern of a parent IAB node comprising a DU that schedules a child IAB node/child UE may continue.

Figure 6:
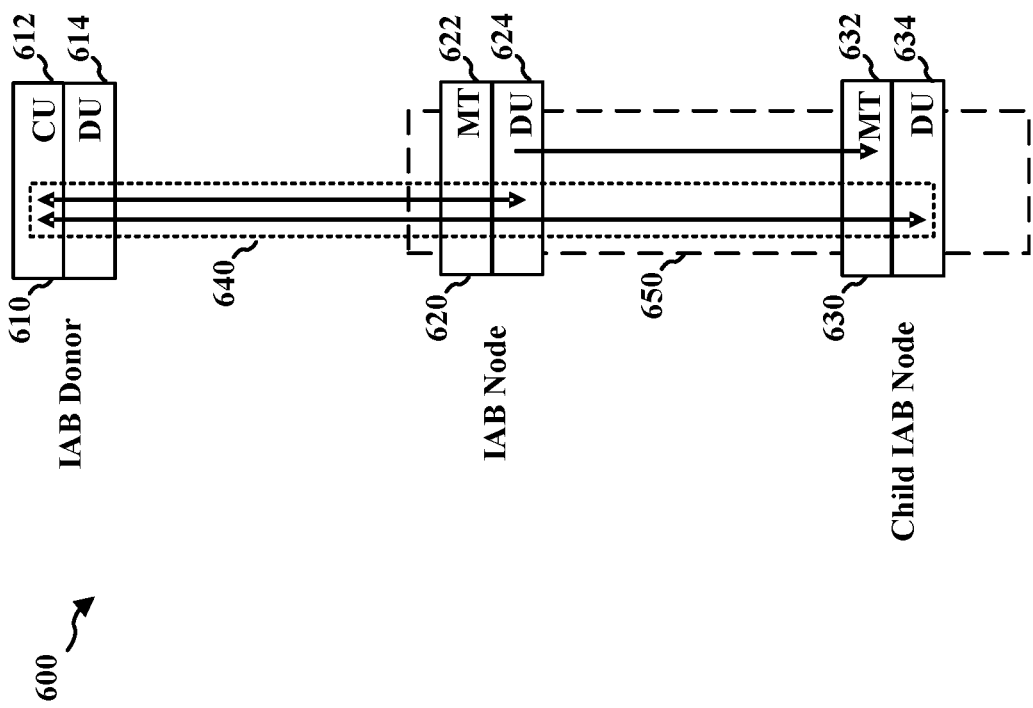
FIG. 6 illustrates examples of interaction between an IAB donor, an IAB node, and a child IAB node.

FIG. 6 illustrates examples of interaction 600 between an IAB donor 610, an IAB node 620, and a child IAB node 630. The CU 612 of the IAB donor 610 may provide a centralized management of the resources available for communication of the IAB nodes. For example, the CU 612 of the IAB donor 610 may allocate the resources semi-statically. Additionally, or alternatively, the soft resources of a child node may be controlled in a distributed dynamic fashion by the parent of the child node (e.g., the DU 624 or 614 of the parent node). For example, the DU 624 of the IAB node 620 may allocate the soft resources of the child IAB node 630 through dynamic control signaling.

The MTs 622 and 632 may have resources that are downlink (DL) resources, uplink (UL) resources, or flexible (F) resources. In one example, the DUs 614, 624, and 634 may have hard DL resources, hard UL resources, and/or hard F resources. In another example, the DUs 614, 624, and 634 may have soft DL resources, soft UL resources, and/or soft flexible resources. In addition to hard or soft resources types, the DUs 614, 624, and 634 may have resources that are not available (NA) type resources.

The CU 612 of the IAB donor 610 may communicate with the DU 624 of the IAB node 620 and the DU 634 of the child IAB node 630 over an F1 interface 640. The F1 interface 640 may support exchanging information with or transferring encapsulated RRC messages to a child IAB node (e.g., the MT of a child of the receiving IAB node) (e.g., transferring an encapsulated RRC message for the child IAB node 630 to the DU 624 of the IAB node 620). In some aspects, the CU 612 may configure the resource pattern of the DU 624 of the IAB node 620 over the F1 interface 640.

The DU 624 of the IAB node 620 may communicate with the MT 632 of the child IAB node 630 over a Uu air interface 650. The Uu air interface 650 may support transferring RRC messages received from the CU 612 of the IAB donor 610 to the MT 632 of the child IAB node 630, and may support the DU 624 of the IAB node 620 dynamically scheduling the MT 632 of the child IAB node 630. In some aspects, the IAB node 620 may dynamically control the soft resources of the DU 634 of the child IAB node 630 over the Uu air interface 650.

Figure 7:
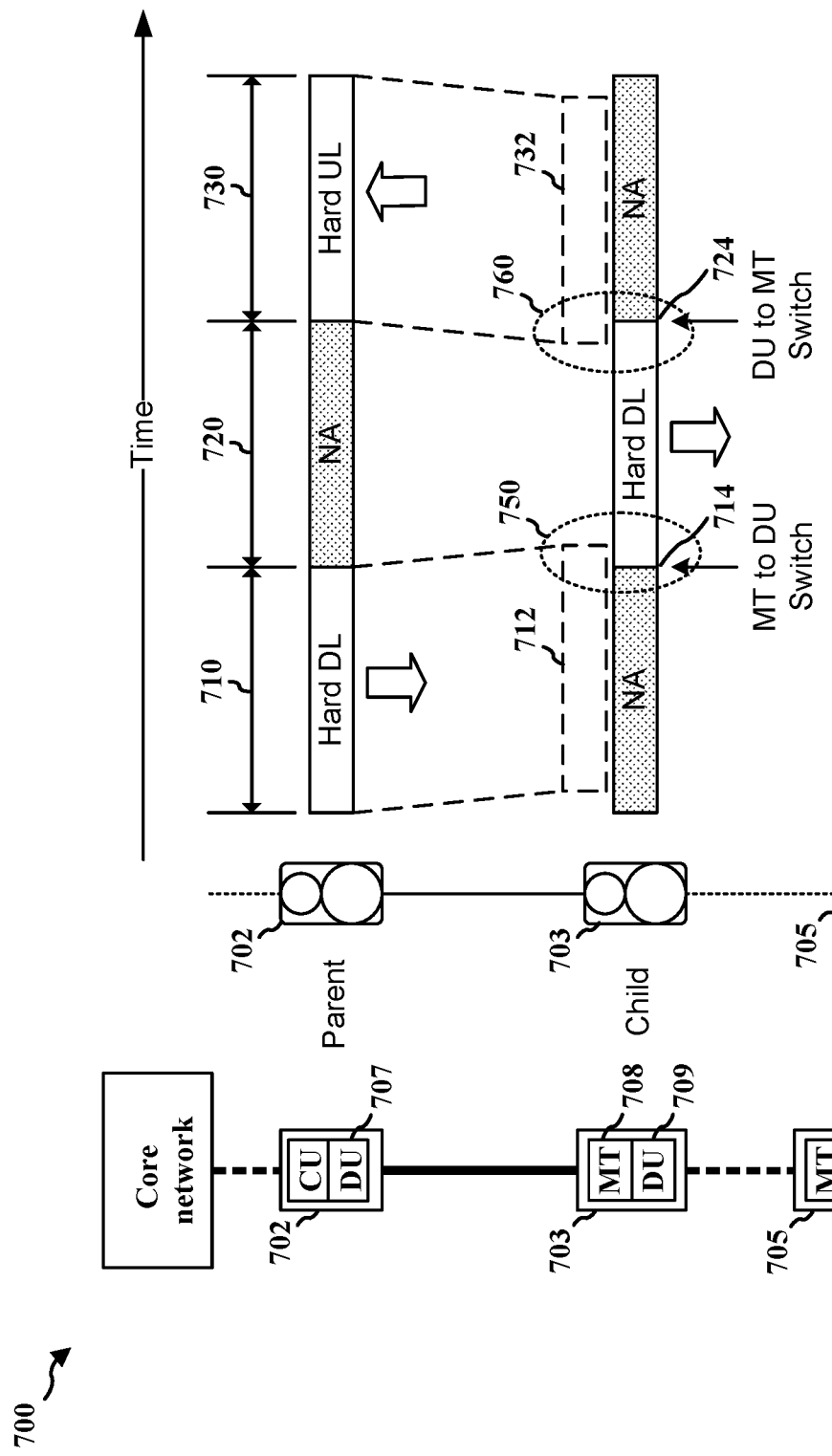
FIG. 7 is a diagram illustrating an example of communication between a child IAB node and its parent node.

FIG. 7 is a diagram 700 illustrating an example of a communication between a child IAB node and its parent node, which shows transitions at the child IAB node between MT based communication and DU based communication. In one example, a child IAB node 703 may be communicating in a time division duplex (TDD) mode. The child IAB node 703 may communicate with its parent IAB node 702 (e.g., the DU 707 of the parent IAB node 702) through the MT 708 of the child IAB node 703, and the child IAB node 703 may communicate with its children (e.g., grand-child IAB nodes 705 or one or more UEs) through the DU 709 of the child IAB node 703. DU resources may be allocated as UL, DL, or flexible. For example, the parent node 702 may transmit downlink information to the MT 708 of the child IAB node 703. The DU 707 of the parent IAB node 702 may receive uplink information from the child IAB node 703 on resources configured as UL. The MT 708 of the child node 703 may determine whether resources configured as flexible is be used as DL or UL at a later time, for example based on receiving an indication (e.g., from the parent IAB node 702).

The DU resources may be configured as hard, soft, or not available (NA), to avoid conflict with resources being utilized by the MT. In some examples, when a DU resource is configured as hard, the DU may use the DU resource regardless of the MT's configuration. For example, the DU 707 of the parent node 702 may determine whether to use the hard resource to communicate with the child IAB node 703 regardless of whether the MT 708 of the child IAB node 703 has an allocation from the parent IAB node. In some aspects, the DU 709 of the child IAB node 703 may allocate overlapping resources to communicate with its child node, such as a grand-child IAB node 705. In some aspects, the DU 709 may decide to give priority to the MT 708 to communicate with the parent IAB node 702 and not to use the hard resource to communicate with its child IAB node (e.g., the grand-child IAB node 705). When a resource is configured as NA, the resource may be unavailable for use by the DU 709. When a resource is configured as soft, the DU 709 may use the resource based on whether using the resource may impact the MT 708's transmitting or receiving on the resource. In some examples, a soft resource may be explicitly or implicitly indicated as available. For example, a soft resource may be explicitly indicated as available when the parent IAB node 702 indicates to the child IAB node 703 that the resource will be available (e.g., the parent has not scheduled the MT of the child IAB node to transmit on the soft resource). A soft resource may be implicitly indicated as available when the child IAB node 703 determines that its DU 709 may utilize the soft resources without interfering with transmission or reception at the MT 708 (e.g., without receiving an indication from the parent IAB node 702).

In one example, the parent IAB node 702 may communicate with the child IAB node 703 on a first set of time domain resources 710 and a third set of time domain resources 730. Although the parent IAB node 702 is illustrated as transmitting downlink data to the child IAB node 703 using the first set of time domain resources 710, aspects presented herein may similarly include the reception of uplink communication using the first set of time domain resources 710.

The child IAB node 703 may transmit downlink data to a child entity, such as the grand-child IAB node 705 or a UE, using the second set of time domain resources 720. In one example, the second set of time domain resources 720 may be configured as hard at the child DU 703, and may be configured as NA at the parent DU 707, as such, the MT 708 of the child IAB node 703 and the DU 707 of the parent IAB node 702 may not communicate with one another using the second set of time domain resources 720.

The child IAB node 703 may transmit uplink data to the parent IAB node 702 using the third set of time domain resources 730. The third set of time domain resources 730 may be configured as UL for the child MT 708 to transmit the uplink data to the parent DU 707. The third set of time domain resources 730 may be configured as NA at the DU 709 of the child IAB node 703 to prevent the DU 709 from interfering with the MT 708's transmission of the uplink data to the DU 707 of the parent IAB node 702. The third set of time domain resources 730 may be configured as hard for at the DU 707 of the parent IAB node 702 so that the DU 707 may decide whether to use the third set of time domain resources 730 to receive the uplink data from the MT 708 of the child IAB node 703.

As the child IAB node 703 may be communicating with the parent IAB node 702 using the first set of time domain resources 710 via the MT 708, and the child IAB node 703 may be communicating with the grand-child IAB node 705 using the second set of time domain resources 720 via the DU 709, the child IAB node 703 may perform a transition/switch between its MT 708 and DU 709 (e.g., an IAB MT to DU switch) between the two sets of time domain resources 710 and 720, such as illustrate d at 714. Similarly, as the child IAB node 703 may be communicating with the grand-child IAB node 705 using the second set of time domain resources 720 via the DU 709, and the child IAB node 703 may be communicating with the parent IAB node 702 using the third set of time domain resources 730 via the MT 708, the child IAB node 703 may performs a transition/switch between its DU 709 and MT 708 (e.g., an IAB DU to MT switch) between the two sets of time domain resources 720 and 730, such as illustrated at 724.

In some examples, due to propagation latency or timing advance, an overlap in resource allocation may occur between the MT and the DU of an IAB node, where the MT of the IAB node may switch to the DU according to a schedule while the IAB node's parent (e.g., the parent IAB node) is still transmitting data from the DU of the parent IAB node. For example, referring back to FIG. 7, although the DU 707 of the parent IAB node 702 is transmitting downlink data using the first set of time domain resources 710, the downlink data may be received by the child IAB node 703 with a delay, such as illustrated at 712. As such, as shown at 750, some of the transmissions using the first set of time domain resources 710 may overlap with the second set of time domain resources 720, which may be configured by the MT 708 of the child IAB node 703 for transmitting a downlink data to another device, such as the grand-child IAB node 705. Similarly, as shown at 732, an uplink data transmission using the third set of time domain resources 732 from the child IAB node 703 to the parent IAB node 702 may be overlapped at least in part (e.g., as shown at 760) due to propagation delay or timing advance.

In some aspects, to reduce or avoid overlapping or interference, a parent IAB node and child IAB nodes may utilize guard symbols at MT to DU or DU to MT transitions (e.g., at 714 and 724). A guard symbol may be a resource in which an IAB node is configured not to transmit anything during the guard symbol. As an IAB node may utilize different components (e.g., different transmitter(s), different receiver(s), or different antenna(s), etc.) and/or different analog beams for its MT and its DU, the guard symbols may provide a transition time for the IAB node to switch between components used for the MT and components used for the DU. The guard symbols may also prevent communication overlapping between an MT and a DU of an IAB node, such as described in connection with 750 and 760 of FIG. 7, due to propagation delay or timing advance.

Figure 8:
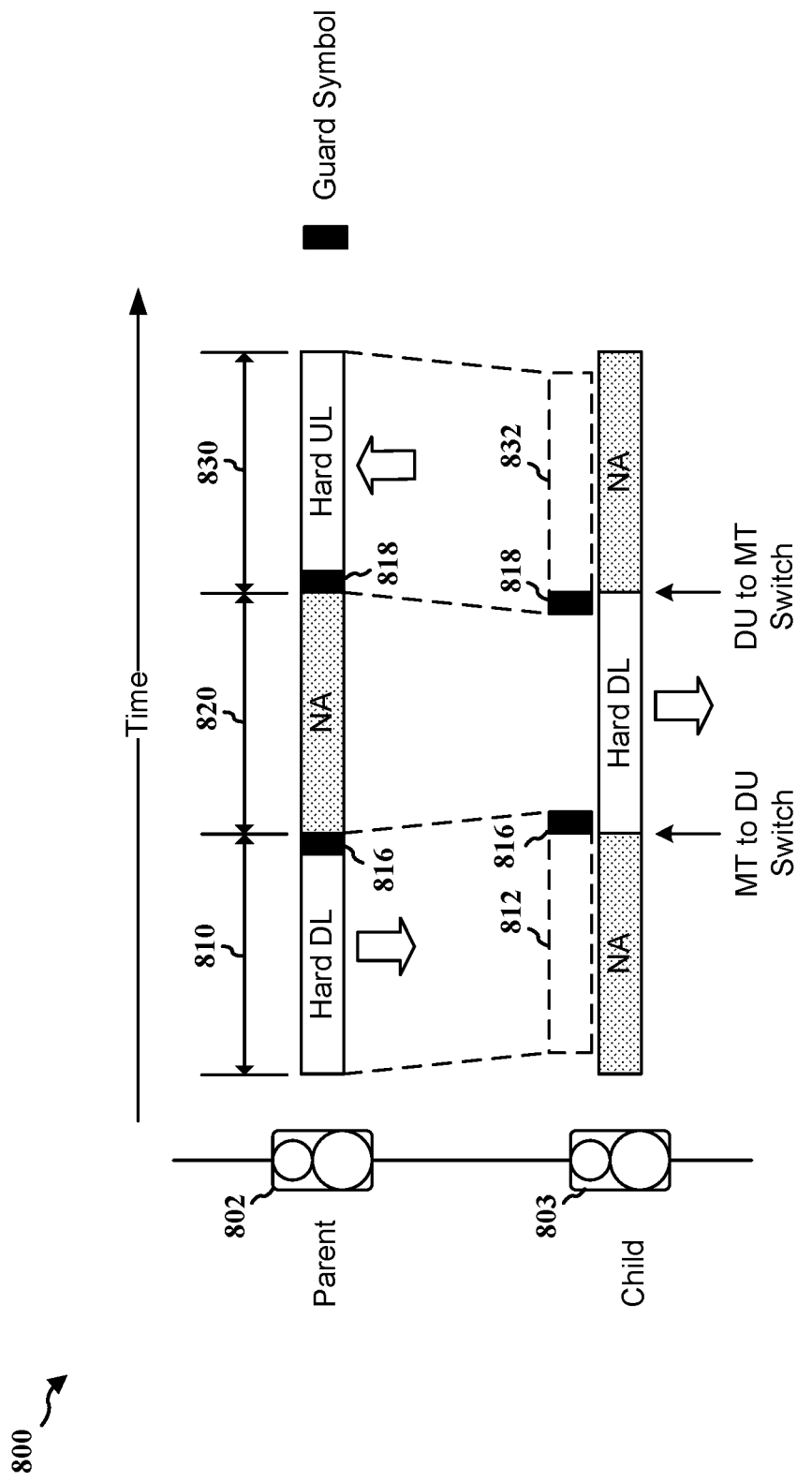
FIG. 8 is a diagram illustrating an example of guard symbol signaling between a child IAB node and a parent IAB node.

FIG. 8 is a diagram 800 illustrating an example of guard symbols. A parent IAB node 802 may transmit a first downlink data using a first set of resources 810. However, the transmission may be received at a child IAB node 803 with a delay, such as shown at 812. As such, a portion of the first downlink data may overlap with a second set of resources 820 in which the child IAB node 803 (e.g., the MT of the child IAB node 803) is configured for transmitting a second downlink data to another device, such as a child IAB node or a UE. To avoid resource overlapping, the parent IAB node 802 may configure guard symbols 816 at the end of the first set of resources 810 to provide a transition time for the child IAB node 803 to transition/switch from using its MT for receiving the first downlink data to using its DU for transmitting the second downlink data without conflict. In some examples, the guard symbols 816 may also be configured by the child IAB node 803 at the beginning of the second set of resources 820 to serve similar purpose. Similarly, as shown at 832, an uplink data transmitted on a third set of resources 830 from the child IAB node 803 to the parent IAB node 802 may be overlapped with the child IAB node 803's transmission of the second downlink data on the second set of resources 820. Thus, the parent IAB node 802 may configure guard symbols 818 at the beginning of the third set of resources 830 to provide a transition time for the child IAB node 803 to transition/switch from using its DU for transmitting the second downlink data to using its MT for transmitting the uplink data without conflict. Similarly, the guard symbols 818 may also be configured by the child IAB node 803 at the end of the second resources 820 to serve similar purpose.

Figure 9:
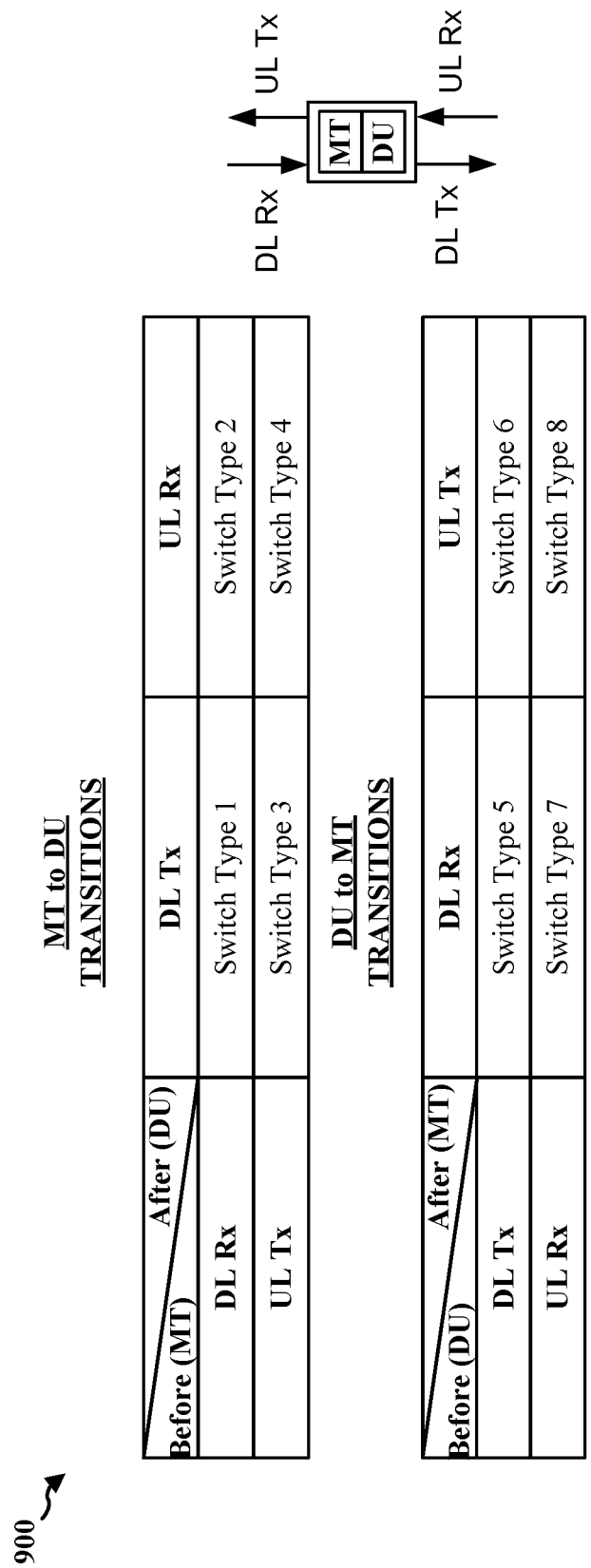
FIG. 9 is a diagram illustrating an example of IAB node transition types.

FIG. 9 is a table 900 illustrating examples of IAB node transition types. A transition type may be based on the configuration of the resources immediately before and/or immediately after a transition. A given resource may be configured for use by an MT of an IAB node or for use by a DU of the IAB node. For example, a resource configured for the MT may be used for receiving a downlink data from a parent IAB node (DL Rx) or used for transmitting an uplink data to the parent IAB node (UL Tx). A resource configured for the DU may be used for transmitting a downlink data to a child IAB node (DL Tx) or for receiving an uplink data from the child IAB node (UL Rx).

A transition from using the MT to receive the downlink data (DL Rx) to using the DU to transmit the downlink data (DL Tx) may be referred to as a Switch Type 1 transition. A transition from using the MT to receive the downlink data (DL Rx) to using the DU to receive the uplink data (UL Rx) may be referred to as a Switch Type 2 transition. A transition from using the MT to transmit the uplink data (UL Tx) to using the DU to transmit the downlink data (DL Tx) may be referred to as a Switch Type 3 transition. A transition from using the MT to transmit the uplink data (UL Tx) to using the DU to receive the uplink data (UL Rx) may be referred to as a Switch Type 4 transition. A transition from using the DU to transmit the downlink data (DL Tx) to using the MT to receive the downlink data (DL Rx) may be referred to as a Switch Type 5 transition. A transition from using the DU to transmit the downlink data (DL Tx) to using the MT to transmit the uplink data (UL Tx) may be referred to as a Switch Type 6 transition. A transition from using the DU to receive the uplink data (UL Rx) to using the MT to receive the downlink data (DL Rx) may be referred to as a Switch Type 7 transition. A transition from using the DU to receive the uplink data (UL Rx) to using the MT to transmit the uplink data (UL Tx) may be referred to as a Switch Type 8 transition.

The number of guard symbols provided at a transition time may be based on the transition types (e.g., Switch Types 1 to 8), and the number of symbols provided for a given transition type may be based on the switching and signal propagation requirements for the transition. For example, in some aspects, transitions of Switch Types 1, 4, 5, and 8 may receive guard symbols to provide for switching from the transmitter to the receiver. In some aspects, transitions of Switch Types 1 and 2 may receive guard symbols to provide for a propagation delay based on the distance from the parent IAB node. In some aspects, transitions of Switch Types 7 and 8 may receive guard symbols to provide for a propagation delay based on the distance from the child IAB node or UE. In some aspects, transitions of Switch Types 1 to 8 may receive guard symbols to provide for switching antennas. The number of guard symbols provided for a given transition type may be based on an indication of requested guard symbols (e.g., "GuardSymbolsDesired") transmitted from the child IAB node to the parent IAB node and on an indication of the provided guard symbols (e.g., "GuardSymbolsProvided") transmitted from the parent IAB node to the child IAB node, which will be discussed further below.

Figure 10:
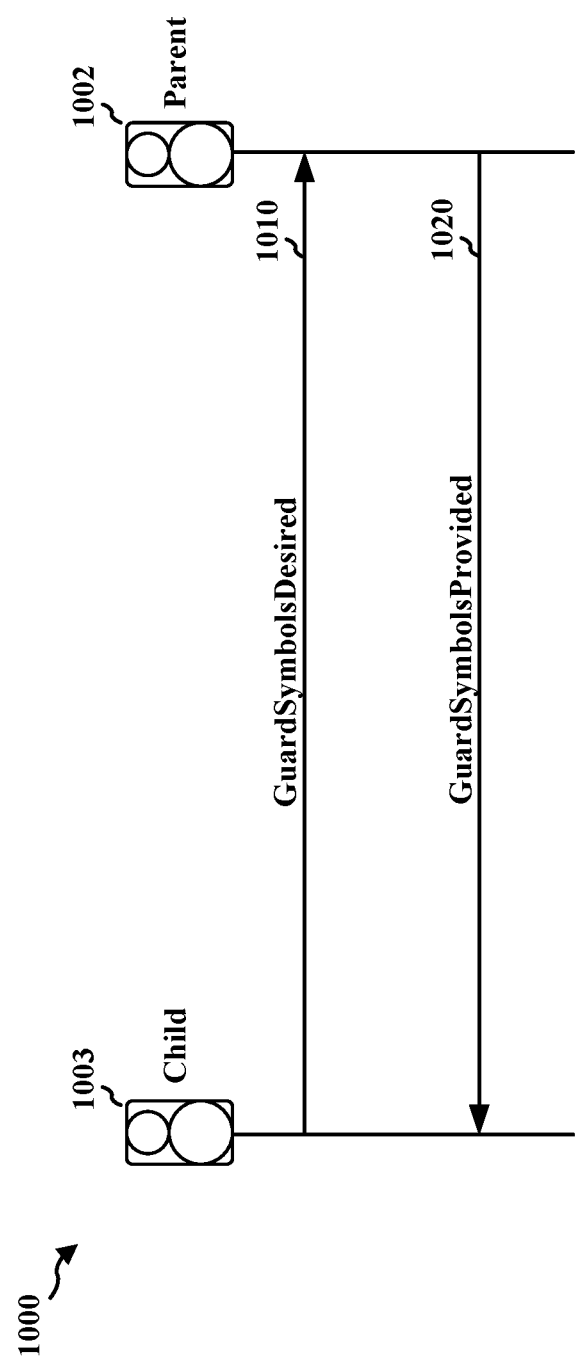
FIG. 10 is a diagram illustrating an example of guard symbol signaling between a child IAB node and a parent IAB node.

FIG. 10 is a communication diagram 1000 illustrating an example of a guard symbol signaling between a child IAB node 1003 and a parent IAB node 1002. The guard symbols for a transition may be located at the resources immediately before the transition, at the resources immediately after the transition, or may be split between both the resources immediately before and immediately after the transition. The child IAB node 1003 and the parent IAB node 1002 may communicate with each other to determine whether the guard symbols are being configured, and/or how many of the guard symbols are to be provided by the child IAB node 1003 and how many of the guard symbols are to be provided by the parent IAB node 1002, etc.

In some examples, the child IAB node 1003 may have a set of desired guard symbols (e.g., "GuardSymbolDesired") values corresponding to different transition types, such as the Switch Types 1-8 discussed in connection with to FIG. 9. The value of the desired guard symbols may identify a number of guard symbols requested by the child IAB node 1003 to perform a transition. The child IAB node 1003 may transmit a signal 1010 to the parent IAB node 1002 indicating a number of requested guard symbols (e.g., in a "GuardSymbolsDesired" parameter). The signal 1010 may include some or all of the values corresponding to different transmission types. In some aspects, the signal 1010 may include one or more media access control (MAC) control elements (MAC CEs). In some aspects, if a value is not included for a transition type, zero guard symbols may be provided for that transition type.

The parent IAB node 1002 may respond by transmitting a signal 1020 indicating an amount of guard symbols that are to be provided by the parent IAB node 1002 (e.g., in a "GuardSymbolsProvided" parameter). The signal 1020 may include values corresponding to transition types, such as the Switch Types 1-8. The value for a transition type may indicate a number of guard symbols which the parent IAB node 1002 may provide when the child IAB node 1003 performs a transmission of that type. The value included in the signal 1020 for a transition type may be equal to or less than the value included in the signal 1010 for that transition type. In some aspects, the value included in the signal 1020 may be based on resource utilisation and/or performance impact. In some aspects, if no value is included for a transition type, the parent IAB node 1002 may provide zero guard symbols for that transition type.

When the child IAB node 1003 performs a transition between the use of its MT and the use of its DU, the child IAB node 1003 and the parent IAB node 1002 may provide guard symbols based on the exchanged signals 1010 and 1020. As a transition is between the use of the DU and the use of the MT of the child IAB node 1003, the transition may be adjacent to one set of resources allocated to the MT for communication between the child IAB node 1003 and the parent IAB node 1002, and a second set of resources may be allocated to the DU for communication between the child IAB node 1003 and a child of the child IAB node 1003. The parent IAB node 1002 and the child IAB node 1003 may not transmit or receive on guard symbols allocated to the MT, and the number of allocated guard symbols may be based on the indicated value for that transition type. Similarly, the child IAB node 1003 may not transmit or receive on guard symbols allocated to the DU, and the number of allocate d guard symbols may be based on the value indicated in the signal 1020 and/or the value indicated in the signal 1010 for that transition type. In some aspects, the number of guard symbols provided on the DU by the child IAB node 1003 may be the difference between the values indicated in the signals 1010 and/or 1020.

Referring back to FIG. 8, as described above, the parent IAB node 802 may configure guard symbols (e.g., guard symbols 816, 818) to provide the child IAB node 802 with a transition time to perform transition/switch between the use of its MT and DU. In some examples, the parent IAB node 802 and the child IAB node 803 may make a same determination regarding when a transition instance occurs and the transition type of the transition so that the parent IAB node 802 may provide a number of guard symbols and the child IAB node 803 may determine the same number of guard symbols. Thus, the parent IAB node 802 and the child IAB node 802 may use the same information to determine the transition instance and the transition type.

In certain circumstances, a parent IAB node may not have sufficient information on its child IAB node(s) to identify every actual transition instance (e.g., MT to DU or DU to MT transition) at the child IAB node(s). For example, the parent IAB node may not know a child IAB node's scheduling decision on grand-child node(s). However, the parent node may be able to identify "potential transition instances" to provide guard symbols for the child IAB node. In some examples, rules for determining potential transition instances for providing guard symbols may be explicitly defined (e.g., in a system specification or implementation) for the parent and the child IAB nodes based on common information available at both the parent and the child IAB nodes to avoid ambiguity. In other examples, guard symbols from a parent IAB node may be assumed by a child IAB node at each actual transition instance. These guard symbols may be provided by the parent IAB node at potential transition instances, which may be determined based on a defined set of rules or system implementation. However, there may be inconsistent identification and ambiguity of provided guard symbols between the parent and child IAB node using this approach.

Figure 11B:
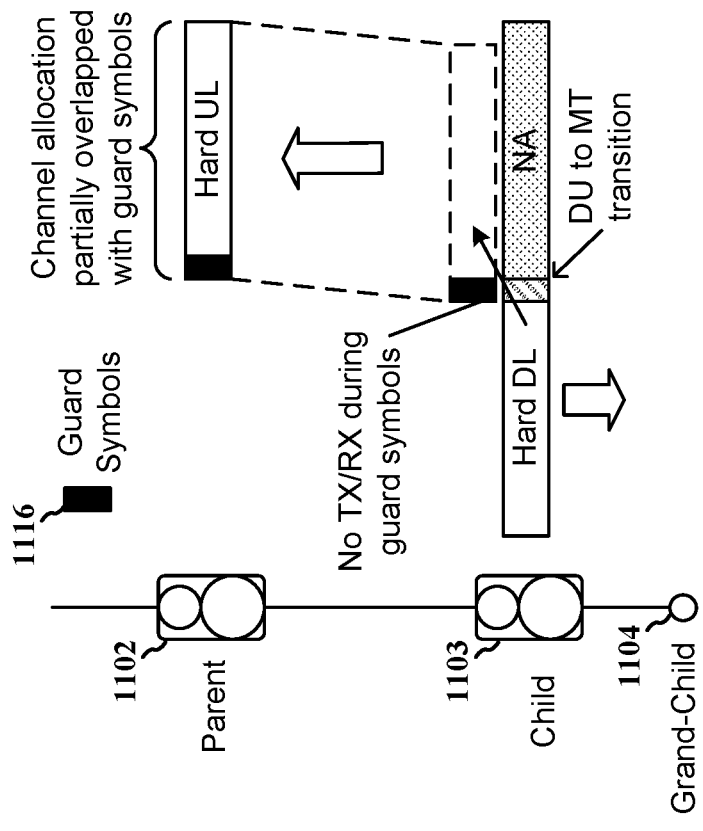
FIG. 11B is a diagram illustrating an example of a communication between a child IAB node and its parent.
Figure 11A:
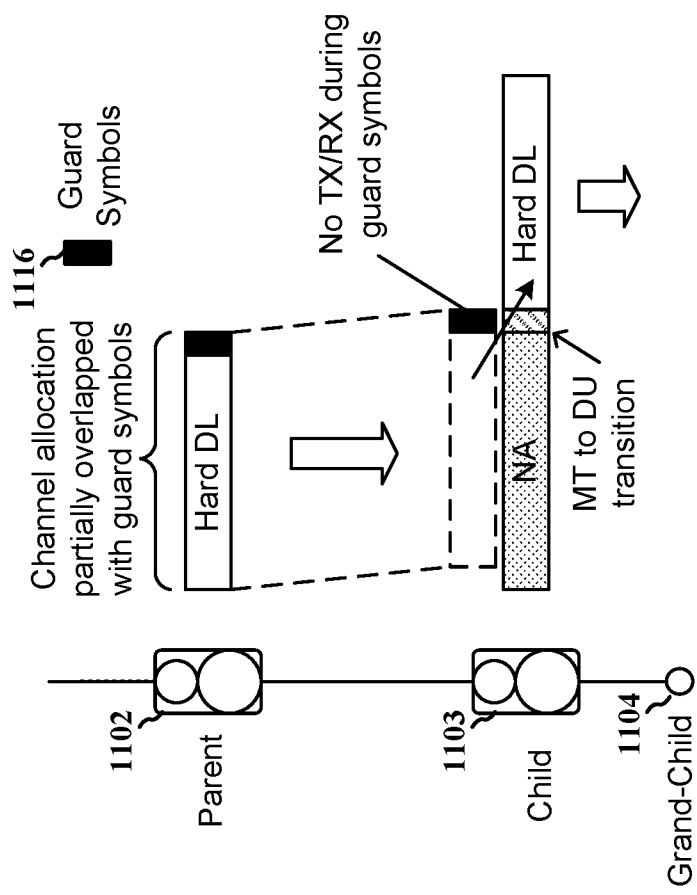
FIG. 11A is a diagram illustrating an example of a communication between a child IAB node and its parent.

FIGS. 11A and 11B are diagrams illustrating examples of communications between a child IAB node 1103 and its parent IAB node 1102, and between the child IAB node 1103 and its child node (e.g., a grand-child node 1104), which may be another IAB node, a UE, etc. While guard symbols 1116 may be used to lessen or prevent channel allocation overlapping between resources that the child IAB node 1103 uses for communicating with the parent IAB node 1102 and the grand-child IAB node 1104, in some instances, guard symbols provided by the parent IAB node 1102 may overlap with channel or signal allocation (e.g., PDCCH, PDSCH, PUSCH etc.) at the child IAB node 1103's MT in a transition instance, where the child IAB node 1103's MT may not be able to transmit or receive data over the provided guard symbols period.

For example, for an MT that is configured with a semi-static (periodic or semi-persistent) resource allocation with guard symbols, the same allocation grant may be repeated periodically (e.g., initially being RRC configured once), and some of the allocation grants may overlap with transition instances at the child IAB node 1103, as shown by FIGS. 11A and 11B. In other examples, for an MT that is configured with dynamic resource allocation with slot aggregation, the same resource allocation may be repeated over multiple slots and one of these allocated slots may overlap with a transition instance at child node.

In some examples, a parent IAB node 1102 may make a dynamic resource allocation for resources that are partially overlapped with transition instances at the child IAB node 1103, e.g., an MT to DU transition or a DU to MT transition in order to communicate with the grand-child node 1104. In other examples, the child IAB node's MT may be configured to cancel or discard the whole resource allocation if a granted resource allocation is partially overlapped with the provided guard symbols from the parent IAB node 1102. In other examples, the child IAB node's MT may be configured to treat a resource allocation partially overlapped with guard symbols as a valid transmission, and may discard or puncture the overlapping portion of the granted resources.

Figure 12:
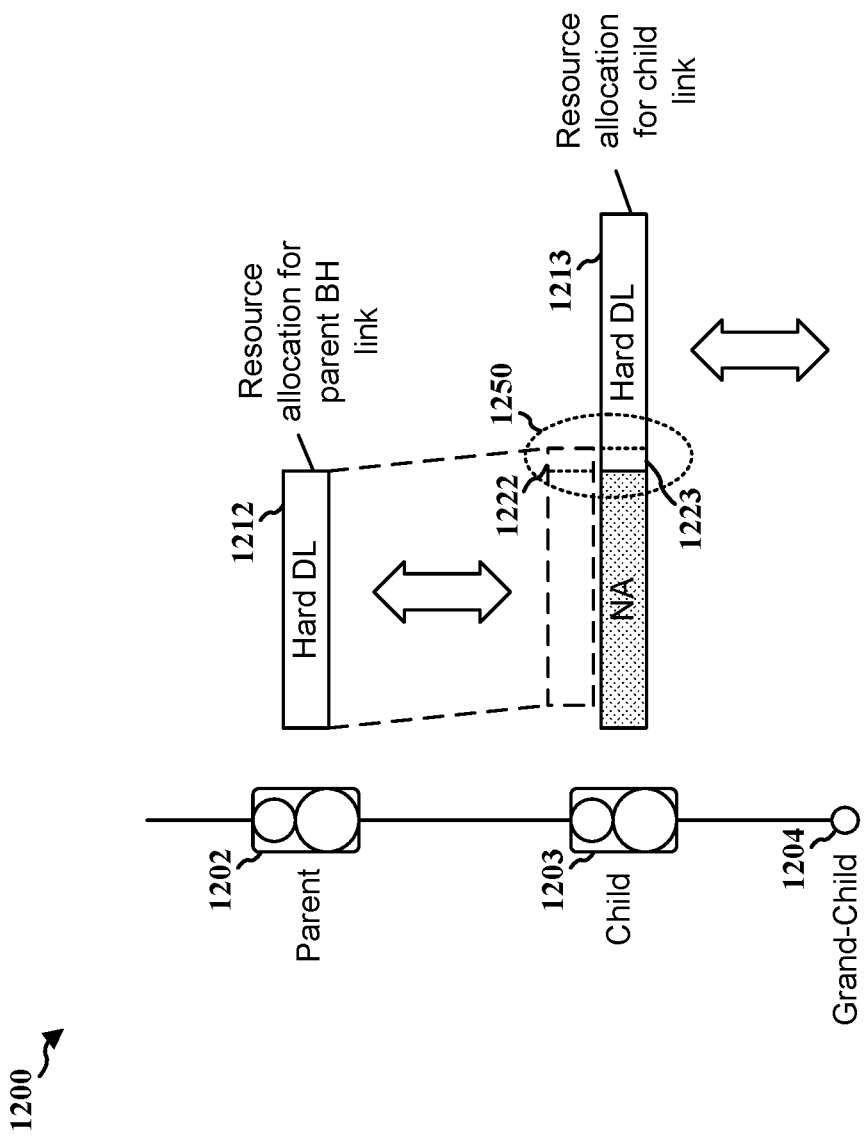
FIG. 12 is a diagram illustrating an example of a communication between a child IAB node and its parent.

In some examples, overlapping between resource allocations may also occur when there are no guard symbols or insufficient guard symbols. For example, as shown by diagram 1200 of FIG. 12, in some transition instances, there may be overlapped time resources between a resource allocation 1212 for a BH link at a parent IAB node 1202 and a resource allocation 1213 for a child link to communicate with a grand-child node 1104 due to zero or insufficient guard symbols, such as shown at 1250. In other examples, in certain system implementations, the parent IAB node 1202 may be configured to provide a number of guard symbols that is less than the number of guard symbols desired by the child IAB node 1203, or zero guard symbols, for one or more Switch Types described in connection with FIG. 9. As such, when a parent IAB node that does not provide sufficient guard symbols for a child IAB node in a resource allocation, the child IAB node may have another resource allocation over a child link with a grand-child node that overlaps with the resource allocation from the parent IAB node.

This resource allocation may be a semi-static (periodic or semi-persistent) resource allocation, a resource allocation with slot aggregation, or a dynamic resource allocation. In some examples, the child IAB node 1103 may be configured (e.g., through system implementation) to handle the resource overlapping. For example, with reference to FIG. 12, if the parent IAB node 1202 and the child IAB node 1203 are communicating with each other based on time division multiplexing (TDD), the child IAB node 1203 may be configured to determine whether to use the overlapped resources for its MT over a backhaul link to the parent IAB node 1202 or for its DU over a child link to the grand-child node 1204. In one example, the IAB node 1203 may determine to puncture the overlapped time resources at one of the overlapping allocations. For example, the child IAB node 1203 may determine to use the overlapped resource portion 1222 of the resource allocation 1212 for communicating with the parent IAB node 1202 via its MT, and the child IAB node 1203 may determine to puncture the overlapped resource portion 1223 of the resource allocation 1213, which may be used for communicating with the grand-child node 1204. Alternatively, the IAB node 1203 may determine to puncture the overlapped resource portion 1222 of the resource allocation 1212 that is scheduled for communicating with the parent IAB node 1202, and the IAB node 1203 may use the overlapped resource portion 1223 of the resource allocation 1213 for communicating with the grand-child node 1204.

As such, there may be circumstances that at least a portion (e.g., symbols) of an allocated resource being discarded or punctured during a transition instance. For example, an allocated resource that overlaps with guard symbols may be punctured as transmission and/or reception may be limited/restricted for an IAB node during the guard symbols period, such as described in connection with FIGS. 11A and 11B. In another examples, depending on a child node's implementation, the overlapped resources may be punctured by the child node's during a transition instance as described in connection with FIG. 12.

To reduce the impact that may be caused by an allocated resource (e.g., allocated symbols) being punctured or cancelled, such as data loss, aspects presented herein may enable a wireless device, such as an IAB node, to modify at least a part of the allocated resource and/or configuration parameters related to the allocated resource when the wireless device determines that the allocated resource may be punctured or cancelled. For example, if a resource allocation is partially punctured at a transition instance, such as due to an overlapping with guard symbols or another resource allocation, an IAB note may be configured to modify at least part of the resource allocation, configuration parameters, and/or specification related to the resource allocation based on a set of rules and/or signaling message(s) to improve the successful reception and/or transmission of the physical channel associated with or scheduled for the allocated resource. Aspects presented herein may apply to overlapping resources between parent/child links, such as when the communication system is full duplex (FD) that leads to puncturing or overlapping of a channel.

In one aspect, if resources configured for demodulation reference signal (DM-RS) in a first resource allocation overlap with one or more guard symbols or other resources in a second resource allocation, a wireless device may be configured to modify the location of the DM-RS to other resources (e.g., symbols) that do not overlap with the guard symbols or the second resource allocation if the first resource allocation and the second resource allocation are scheduled based on TDM. In another aspect, if the first resource allocation and the second resource allocation are scheduled based on frequency division multiplexing (FDM) or space division multiplexing (SDM), the wireless device may be configured to modify the location of the DM-RS to other frequency resources or spaces that do not overlap with the second resource allocation, etc. For example, the location of DM-RS for a physical channel allocation may be RRC configured by a base station, where a wireless device may use the DM-RS to improve decoding of the corresponding physical channel. If the DM-RS is not received by the wireless device, e.g., due to puncturing or discarding resulted from a resource overlapping, the reception of the corresponding physical channel may fail. Thus, if the wireless device has the capabilities to modify the location of the DM-RS when it detects that the configured DM-RS for a channel allocation may be overlapped with guard symbols or another resource allocation, the wireless device may prevent the DM-RS from being punctured or discarded. The modification of the DM-RS location and/or frequency may be determined based on a set of defined rules and/or signaling message(s).

Figure 13:
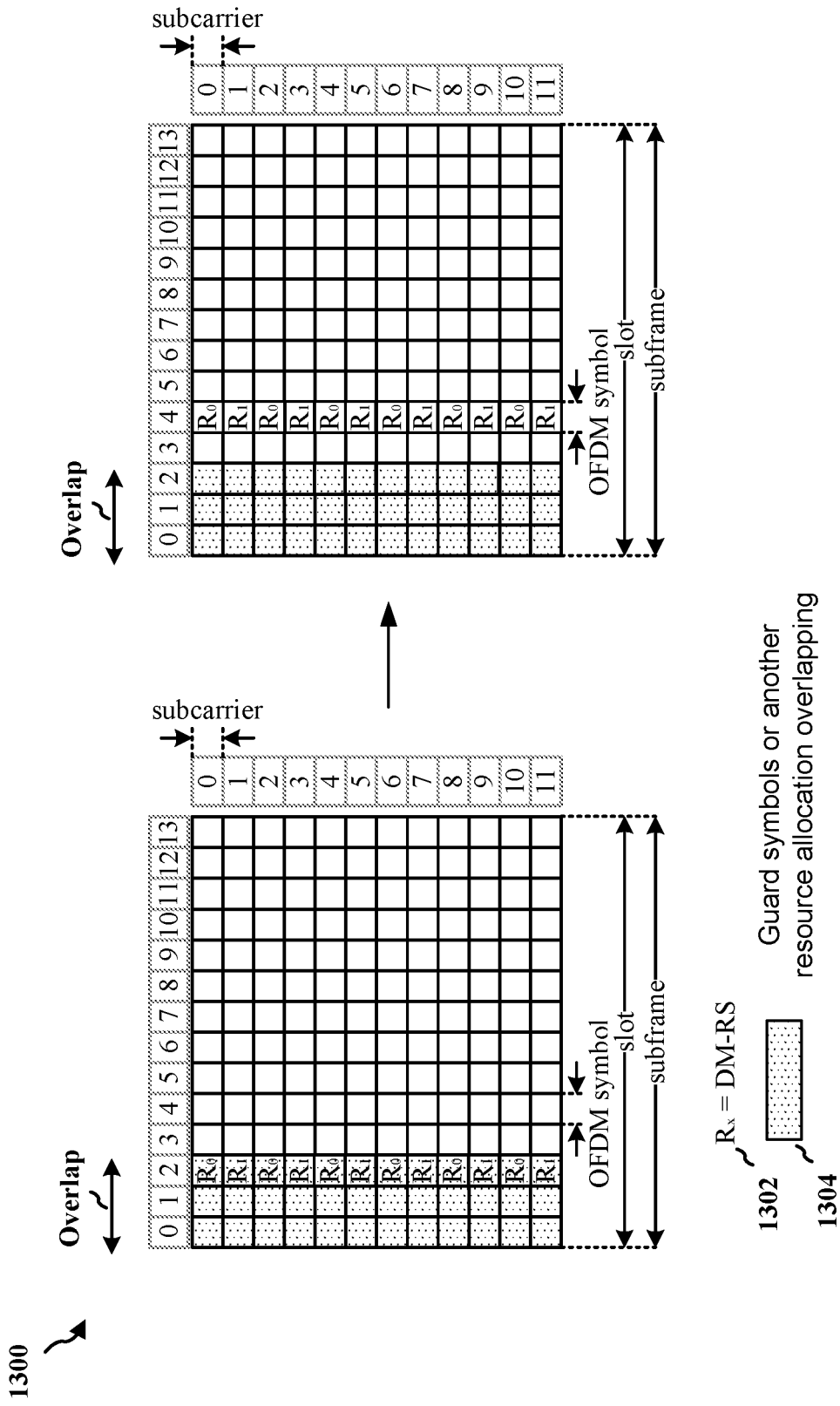
FIG. 13 is a diagram illustrating an example of a resource allocation modification.

FIG. 13 is a diagram 1300 illustrating an example of modifying the location of DM-RS 1302 to avoid DM-RS being punctured. When a wireless device detects that one or more resources configured for DM-RS 1302 overlap with one or more guard symbols 1304 (e.g., at symbol #2), the wireless device may modify the DM-RS 1302 to another time and/or frequency resources that do not overlap with the guard symbols 1304 (e.g., to symbol #4).

In another aspect of the present disclosure, a similar approach may be applied to other types of signaling and data transmissions that may overlap with guard symbols or another allocated resources. For example, if resources allocated for HARQ feedback (e.g., ACK/NACK for a PDSCH transmission) in a PUCCH overlap with guard symbols or a second resource allocation, the resources allocated for the HARQ feedback may be modified to alternative resources that do not overlap with the guard symbols or the second resource allocation. The selection of the modified ACK/NACK resources may be determined based on a set of rules and/or may be based on information signaled between the devices.

In another aspect of the present disclosure, instead of modifying the location of the resources or signals being punctured, a wireless device may modify one or more configuration parameters related to a resource allocation instead when the wireless device determines that the allocated resource may be punctured or cancelled. For example, if a PDSCH or a PUSCH resource allocation is overlapped with guard symbols or a second resource allocation, the redundancy version (RV) of the PDSCH or the PUSCH transmission may be modified to a different value from the RV indicated in the resource allocation. The modification of the RV may avoid systematic bits associated with the PDSCH or the PUSCH being discarded or punctured due to the presence of guard symbols or the second resource allocation.

In another aspect of the present disclosure, if a PDSCH or a PUSCH resource allocation is overlapped with guard symbols or another resources allocation, the modification may include a modified determination of a transport block size due to the presence of the guard symbols or the other resource allocation. For example, the overlapped symbols may not be counted as valid resource elements for the calculation of transport block size.

The modification of resources allocation, configuration parameters, and/or specification related to a resource allocation may be implemented at a wireless device in various ways. In one example, rules regarding resource allocation with puncturing due to partially overlapped time and/or frequency resources during transition instances may be specified in a specification or a system implementation. In another example, signaling messages to support configuration of different sets of parameters associated with and without guard symbols may be specified in a specification or a system implementation. For example, wireless devices may use additional signaling messages to support the use of a dynamic resource allocation with a modified grant to overwrite an existing semi-static (e.g., periodic or semi-persistent) resource allocation or a previously transmitted dynamic allocation (e.g. for cross-slot scheduling), which may have partially overlapped resources with provided guard symbols or with another resource allocation at a transition instance etc.

In some examples, the modification of resources allocation, configuration parameters, and/or specification related to a resources allocation due to overlapping resources may further improve the communication if both the transmitter and receiver IAB nodes (e.g., parent DU and child MT) have the capabilities to make similar determinations about the modification or have similar knowledge about the modification. In one example, a parent IAB node and a child IAB node may use a same defined rule about resource allocations that involve puncturing due to overlapping resources. In another examples, a parent IAB node and a child IAB node may exchange signaling regarding the modifications, such that the parent IAB node and the child IAB may communicate with each other regarding modifying resources allocation and/or configuration parameters. The signaling may be transmitted from an IAB donor or the parent IAB node (e.g., via its DU function) to its child IAB node(s) (e.g., via the child IAB node's MT function) or vice versa.

Figure 14:
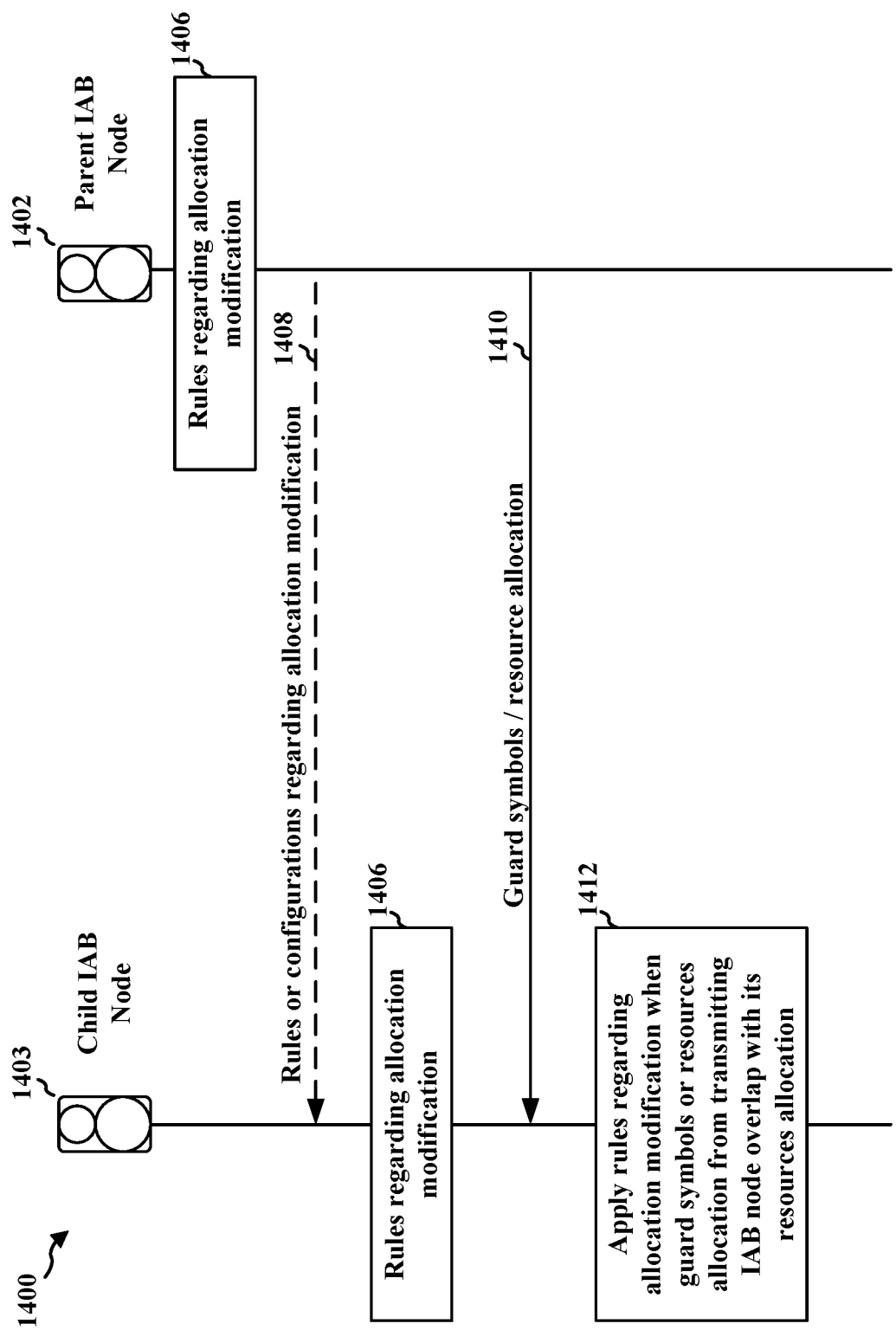
FIG. 14 is a communication flow illustrating an example of a resource allocation modification between a parent IAB node and a child IAB node.

FIG. 14 is a communication flow 1400 illustrating an example of resource allocation modification between a parent IAB node and a child IAB node based on applying a same set of rules for resource allocation modification according to aspects of the present disclosure. In one aspect, as shown at 1406, a set of rules regarding resource allocation modification may be defined at a parent IAB node 1402 and a child IAB node 1403, where information about the set of rules may be provided by an IAB donor to both the parent IAB node 1402 and the child IAB node 1403, and/or the set of rules may be provided by the parent IAB node 1402 (e.g., a parent IAB node) to the child IAB node 1403 (e.g., a child IAB node), such as via a signaling message as shown at 1408. At 1410, the child IAB node 1403 may receive a resource allocation and/or guard symbols from the parent IAB node 1402. At 1412, if the child IAB node 1403 determines that the resource allocation and/or guard symbols from the parent IAB node 1402 may overlap with its resource allocation, the child IAB node 1403 may modify the resource allocation based on the defined set of rules. In one example, the modification may be applied to communication transmitted by the child IAB node 1403 to its child node and/or to the parent IAB node 1402, and/or the modification may be applied to communication that is received by the child IAB node 1403 transmitted from the parent IAB node 1402 and/or from its child node. For example, as described in connection with FIG. 13, if an IAB node detects that resources configured for DM-RS overlap with guard symbols or another resource allocation, the IAB node may modify the location of the DM-RS to non-overlapping resources based on the defined set of rules, such as to a non-overlapping symbol. Similarly, if an IAB node detects that the ACK/NACK PUCCH resources for a PDSCH transmission specified by a resource allocation overlap with guard symbols or another resource allocation, the IAB node may modify the location of the ACK/NACK resources to alternative resources based on the defined set of rules. In one example, the parent IAB-node 1402 may correspond to the parent node 1102 in FIGS. 11A and 11B, and the child IAB-node 1403 may correspond to the child node 1103 in FIGS. 11A and 11B. In another example, the parent IAB-node 1402 may correspond to parent node 1202 in FIG. 12, and the child IAB-node 1403 may correspond to child node 1203 in FIG. 12. In another example, the parent IAB-node 1402 may correspond to child node 1203 in FIG. 12, and the child IAB-node 1403 may correspond to grandchild node 1204 in FIG. 12. Aspects presented herein may be used for interference management in connection with enhanced duplex capability of IAB nodes, and may apply to any types of overlapping resources. As such, aspects presented herein may enable or improve simultaneous transmission operation and/or coexistence of TDM and FD. In addition, aspects presented herein may apply to other types of overlapping resources between parent/child links, such as puncturing of a channel during a full duplex communication, and is not limited to application for puncturing due to transition.

Figure 15:
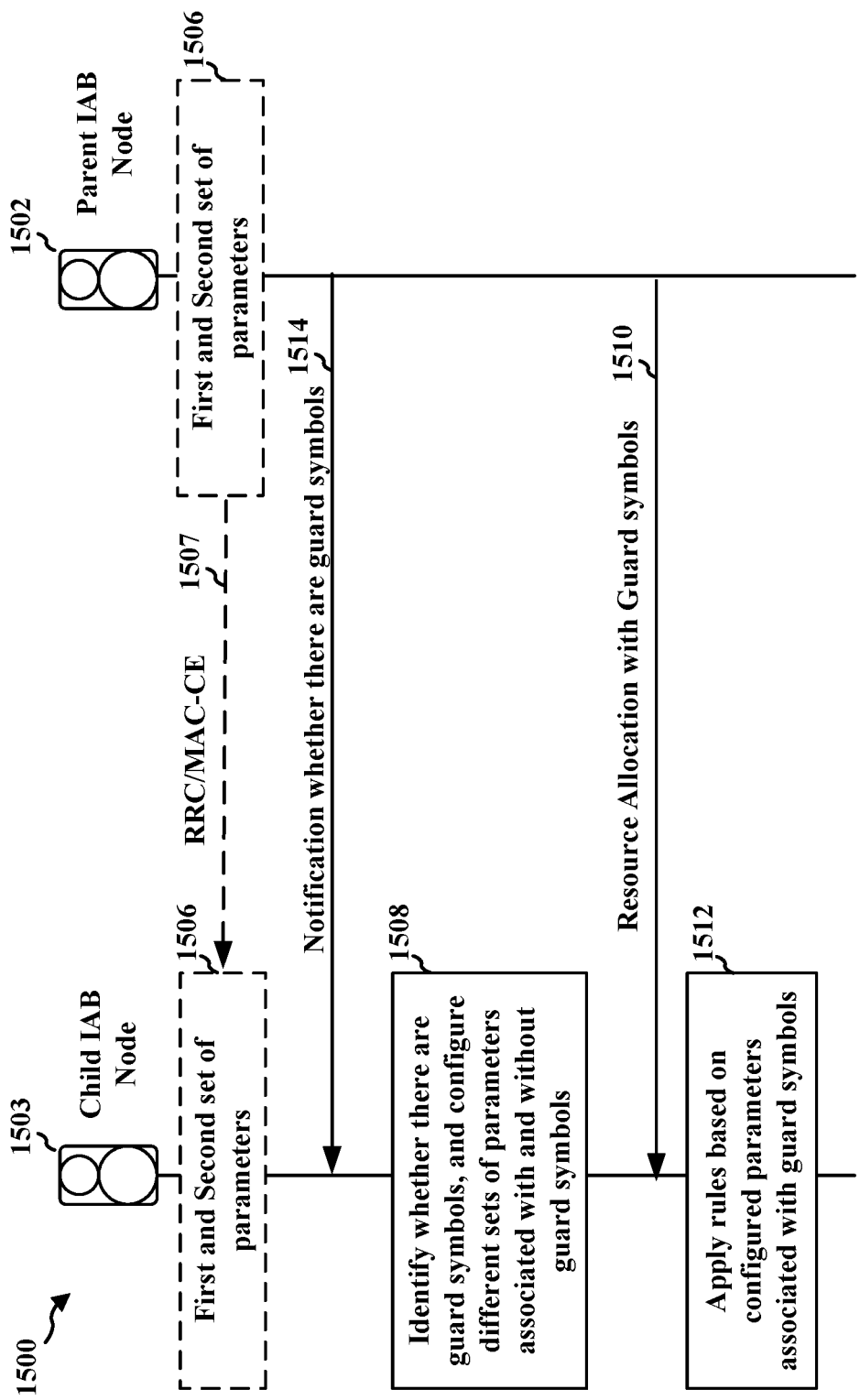
FIG. 15 is a communication flow illustrating resource allocation modification between a parent IAB node and a child IAB node.

FIG. 15 is a communication flow 1500 illustrating an example of a resource allocation modification based on transmitting one or more signaling messages between a parent IAB node 1502 and a child IAB node 1503 according to aspects of the present disclosure. In one example, as shown at 1506, a first set of parameters that is associated with overlapping resource allocations and a second set of parameters that is associated with non-overlapping resource allocations may be configured for a parent IAB node 1502 and/or a child IAB node 1503. For example, the first set of parameters may be associated with the provision of guard symbols, and the second set of parameters may be associated without the provision of guard symbols. In one example, as shown at 1507, the parent IAB node 1502 may indicate/configure the first set of parameters and/or the second set of parameters to the child IAB node 1503, such as via RRC signaling and/or a MAC-CE, etc.

In another example, the first set of parameters and/or the second set of parameters may be defined and known at the child IAB node 1503 and the parent IAB node 1502 (e.g. as described in connection with FIG. 9 where values for guard symbols are defined in a table). In such an example, as shown at 1514, when the parent IAB node 1502 schedules a resource allocation with guard symbols 1510, the parent IAB node 1502 may first transmit a notification (e.g., a signaling message) to the child IAB node 1503 informing the child IAB node 1503 whether there are guard symbols for the upcoming channel allocation(s). At 1508, based on the notification received from the parent IAB node 1502, the child IAB node 1503 may identify whether there are guard symbols in the upcoming channel allocation(s), and the child IAB node 1503 may configure different sets of parameters (e.g., system parameters, software parameters etc.) associated with and without guard symbols. For example, the child IAB node 1503 may apply the first set of parameters for a resource allocation with guard symbols, and the second set of parameters for a resource allocation without guard symbols, etc.

At 1510, the parent IAB node 1502 may provide resource allocation based on the notification. For example, if the parent IAB node 1502 indicates that there are guard symbols allocated for a resource allocation at 1514, then the parent IAB node 1502 may provide a resource allocation with guard symbols at 1510.

At 1512, the child IAB node 1503 may apply the first set of parameters and/or the second set of parameters based on whether the resource allocation from the parent IAB node 1502 is associated with guard symbols. For example, the child IAB node 1503 may apply the first set of parameters to the resource allocation that includes guard symbols. In one example, the first set of parameters and/or the second set of parameters may indicate that if a PDSCH or a PUSCH allocation is overlapped with guard symbols or another resources allocation, the redundancy version of the transmission indicated by the resource allocation may be changed to a different value to avoid systematic bits being discarded or punctured due to the presence of guard symbols. Similarly, the first set of parameters and/or the second set of parameters may indicate that if a PDSCH or a PUSCH allocation is overlapped with guard symbols, the transport block size associated with the PDSCH or the PUSCH may be modified due to the presence of the guard symbols. In one example, the parent IAB-node 1502 may correspond to the parent node 1102 in FIGS. 11A and 11B, and the child IAB-node 1503 may correspond to the child node 1103 in FIGS. 11A and 11B. In another example, the parent IAB-node 1502 may correspond to parent node 1202 in FIG. 12, and the child IAB-node 1503 may correspond to child node 1203 in FIG. 12. In another example, the parent IAB-node 1502 may correspond to child node 1203 in FIG. 12, and the child IAB-node 1503 may correspond to grand-child node 1204 in FIG. 12. Aspects presented herein may apply to other types of overlapping resources between parent/child links, such as puncturing of a channel during a full duplex communication, and is not limited to application for puncturing due to transition.

Figure 16:
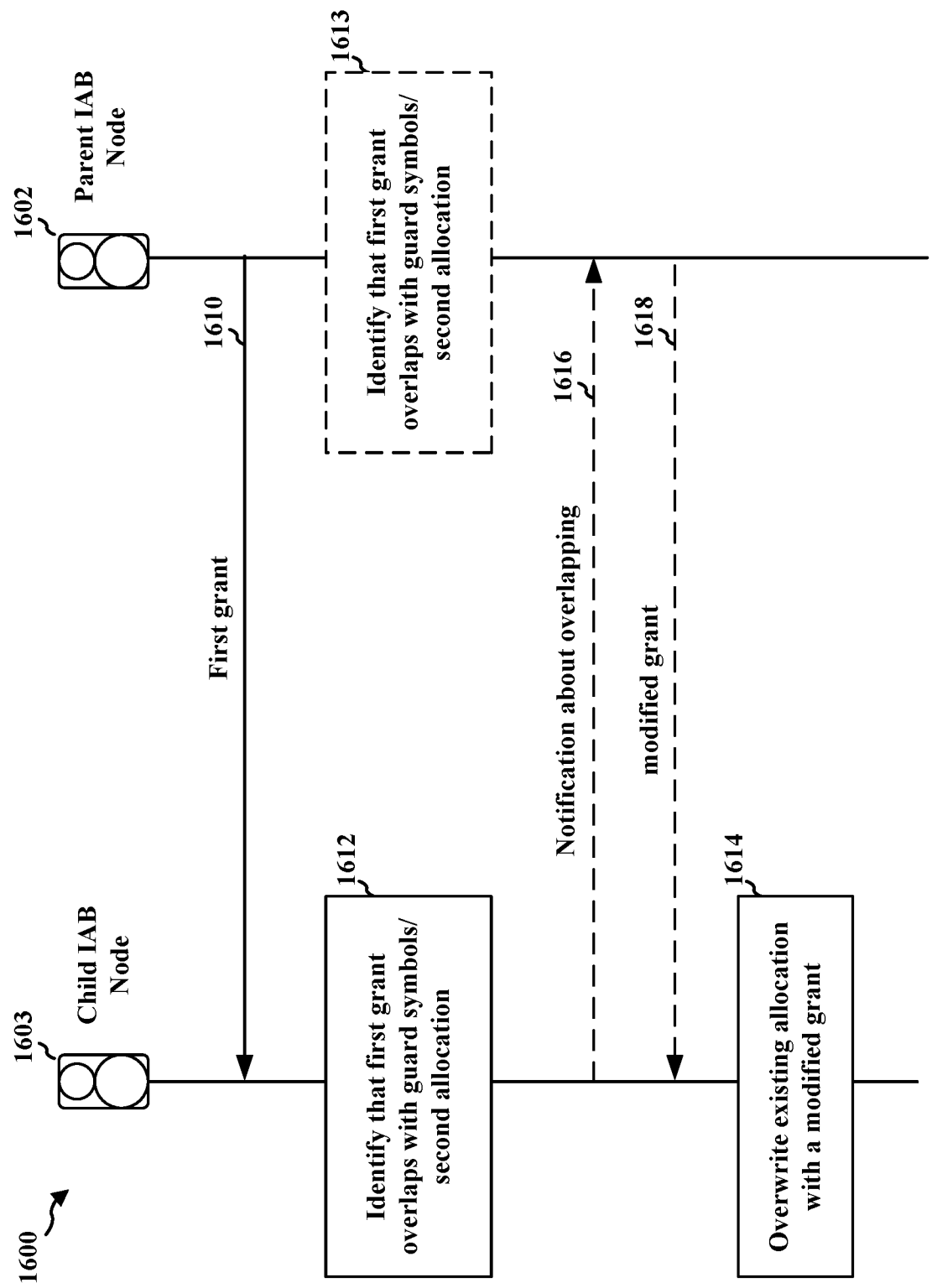
FIG. 16 is a communication flow illustrating resource allocation modification between a parent IAB node and a child IAB node.

FIG. 16 is a communication flow 1600 illustrating an example of resource allocation modification based on modifying an existing resource allocation due to overlapping guard symbols at a transition instance according to aspects of the present disclosure. In one example, as shown at 1610, a child IAB node 1603 may receive a first grant for a first resource allocation from a parent IAB node 1602. In some examples, the first resource allocation may be RRC configured to be semi-static (e.g., periodic or semi-persistent) resource allocation. In other examples, the first grant or the first resource allocation may be based on a previously transmitted dynamic resource allocation (e.g., for cross-slot scheduling).

At 1612, the child IAB node 1603 may identify that the first grant (e.g., the first resource allocation) is partially overlapped with guard symbols or a second resource allocation. In one example, as shown at 1614, if the child IAB node 1603 determines that the first grant overlaps with the guard symbols or the second resource allocation, the child IAB node 1603 may overwrite the first grant with a modified grant based on a set of rules or configurations.

In another example, as shown at 1616, after identifying that the first grant is partially overlapped with guard symbols or with the second resource allocation, the child IAB node 1603 may send a notification (e.g., a signaling message) to the parent IAB node 1602 informing the parent IAB node 1602 about the overlapping. At 1618, in response to the notification, the parent IAB node 1602 may transmit a modified grant to the child IAB node 1603.

In another example, the parent IAB node 1602 may send the modified grant 1618 based on an identification. For example, as shown at 1613, the parent IAB node 1602 may identify that that the resources of the first grant may overlap with guard symbols or a second allocation for the child IAB node 1603. In response, the parent IAB node 1602 may apply the same rule and used by the child IAB node 1603 to override the resource allocation of the first grant, such as by transmitting the modified grant at 1618. In one example, the parent IAB-node 1602 may correspond to the parent node 1102 in FIGS. 11A and 11B, and the child IAB-node 1603 may correspond to the child node 1103 in FIGS. 11A and 11B. In another example, the parent IAB-node 1602 may correspond to parent node 1202 in FIG. 12, and the child IAB-node 1603 may correspond to child node 1203 in FIG. 12. In another example, the parent IAB-node 1602 may correspond to child node 1203 in FIG. 12, and the child IAB-node 1603 may correspond to grand-child node 1204 in FIG. 12. Aspects presented herein may apply to other types of overlapping resources between parent/child links, such as puncturing of a channel during a full duplex communication, and is not limited to application for puncturing due to transition.

Figure 17:
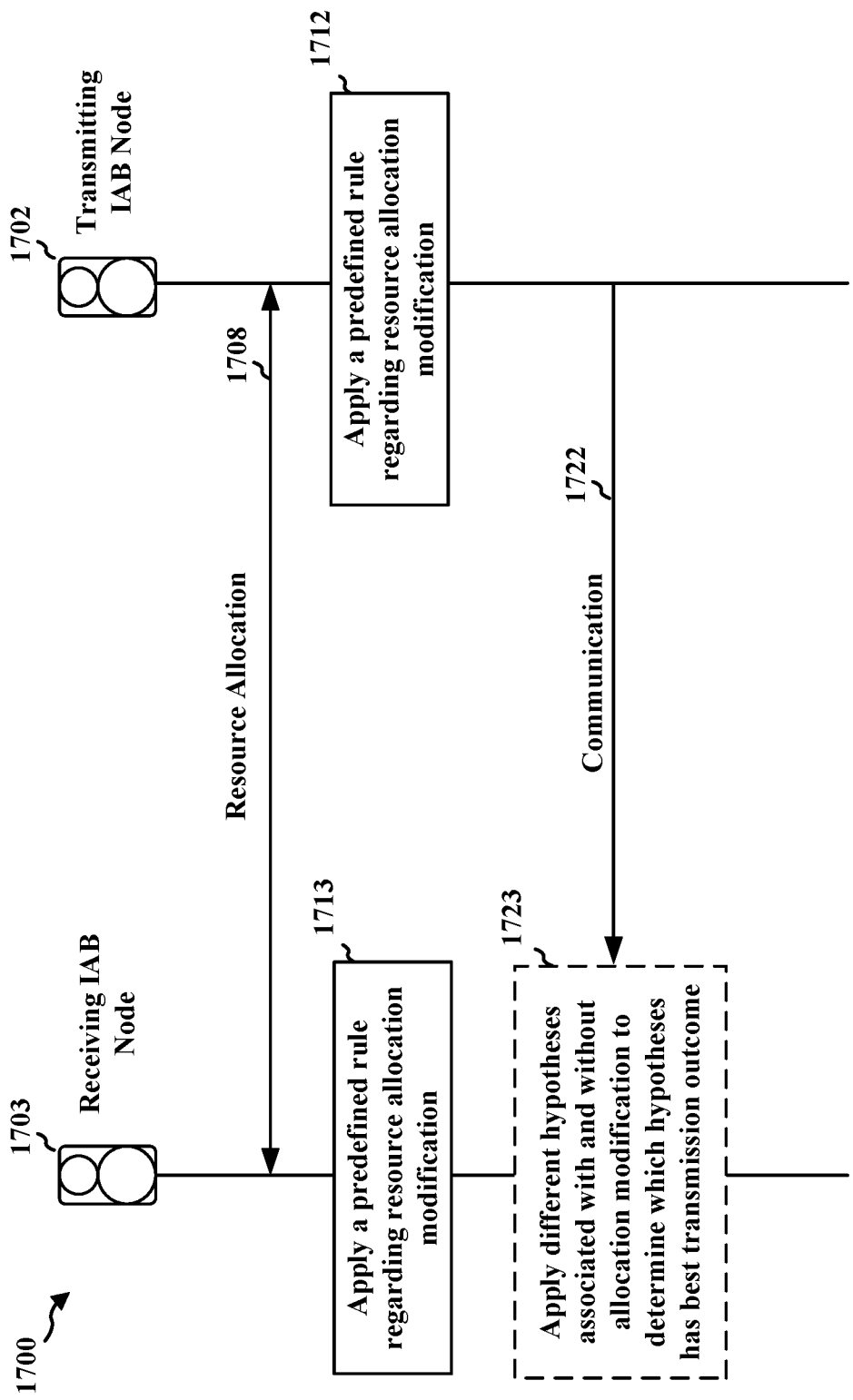
FIG. 17 is a communication flow illustrating resource allocation modification between a transmitting IAB node and a receiving IAB node.

In some examples, a transmitting IAB node and a receiving IAB node may not have the same rule, assumption, view and/or knowledge regarding the resource allocation modification. FIG. 17 is a communication flow 1700 illustrating an example of resource allocation modification between two IAB nodes that do not share a same assumption or knowledge regarding a resource allocation modification according to aspects of the present disclosure.

As shown at 1712 and 1713, a transmitting IAB node 1702 and a receiving IAB node 1703 may each have its own sets of rules or configurations associated with and without guard symbols (e.g., one set of rule(s) or configuration(s) for allocation with guard symbols and another set of rule(s) or configuration(s) for allocation without guard symbols etc.), which may be the same or different. For example, the transmitting IAB node 1702 or the receiving IAB node 1703 may be configured to use different rules/information for identifying guard symbols from each other and/or for the resource allocation modification, etc. Thus, when the transmitting IAB node 1702 and the receiving IAB node 1703 receive a resource allocation, such as shown at 1708, the transmitting IAB node 1702 and the receiving IAB node 1703 may each apply its own rules regarding the determination of whether guard symbols are present and/or resource allocation modification. In other examples, guard symbols may be assumed by an IAB node at each actual transition instance when the IAB nodes do not have consistent rules or assumptions.

In one aspect of the present disclosure, as shown at 1723, if the receiving IAB node 1703 is uncertain about the resource allocation modification being applied by the transmitting IAB node 1702, the receiving IAB node 1703 may be configured to try to apply different hypotheses associated with and without the resource allocation modification to attempt to receive a communication received from the transmitting IAB node 1702, such as shown at 1722. For example, the receiving IAB node 1702 may apply a set of rule(s) or configuration(s) (e.g., a first hypothesis) that modifies resource allocation, and may apply another set of rule(s) or configuration(s) (e.g., a second hypothesis) that does not modify resource allocation in attempting to receive communication 1722 based on the resource allocation 1708. Aspects presented herein may apply to other types of overlapping resources between parent/child links, such as puncturing of a channel during a full duplex communication, and is not limited to application for puncturing due to transition.

Figure 18:
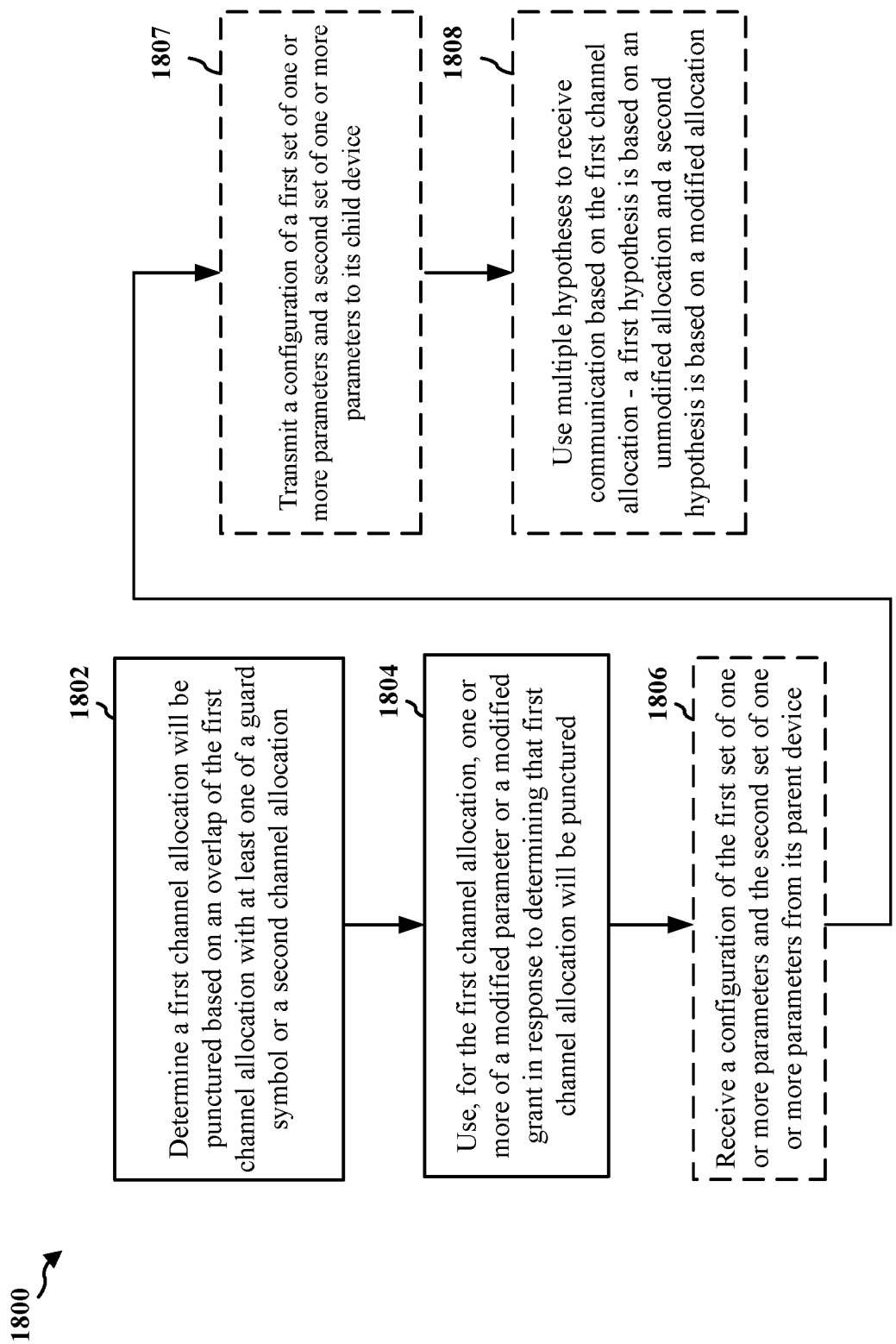
FIG. 18 is a flowchart of a method of wireless communication in accordance with aspects presented herein.

FIG. 18 is a flowchart 1800 of a method of wireless communication at a wireless device. The method may be performed by an IAB node, a base station or a component of a base station (e.g., the base station 102, 180; the device 310; the IAB node 410, 420, 510, 520a, 520b, 610, 620, 630, 702, 703, 705, 802, 803, 1002, 1003, 1103, 1203, 1403, 1503, 1603, 1703; the apparatus 1902; a processing system, which may include the memory 376 and which may be the device 310 or a component of the device 310, such as the TX processor 316, the RX processor 370, and/or the controller/processor 375). Optional aspects are illustrated with a dashed line. The method may enable an IAB node to modify a resource allocation or change one or more parameters related to the resource allocation when the IAB node detects that the resource allocation overlaps with guard symbols or another resource allocation. Aspects of the method may improve communication between IAB nodes.

At 1802, the wireless device may determine a first channel allocation will be punctured based on an overlap of the first channel allocation with at least one of a guard symbol or a second channel allocation, such as described in connection with FIGS. 14 to 17. For example, at 1412 of FIG. 14, the child IAB node 1403 may determine whether the guard symbols and/or resource allocation from the parent IAB node overlap with its resource allocation. The determination of whether the first channel allocation will be punctured may be performed, e.g., by the puncture determination component 1940 of the apparatus 1902 in FIG. 19. In one example, the wireless device may include an IAB node. For example, the first channel allocation may be from the parent node of the wireless device to the wireless device, and the second channel allocation may be from the wireless device to a child node of the wireless device. In another example, the first channel allocation may be from the parent node of the IAB-node to the IAB-node using MT function of the IAB-node, and the second channel allocation may be from the IAB-node to a child node of the IAB-node using DU function of the IAB-node. In another example, the first channel allocation may be from the wireless device to a child node of the wireless device, and the second channel allocation may be from parent node of the wireless device to the wireless device. For example, the first channel allocation may be from the IAB-node to a child node of the IAB-node using DU function of the IAB-node, and the second channel allocation may be from the parent node of the IAB-node to the IAB-node using MT function of the IAB-node.

At 1804, the wireless device (e.g., the IAB-node) may use, for the first channel allocation, one or more of a modified parameter or a modified grant in response to determining the first channel allocation will be punctured, such as described in connection with FIGS. 14 to 17. For example, at 1412 of FIG. 14, the child IAB node 1403 may apply rules regarding allocation modification when guard symbols or resources allocation from transmitting IAB node overlap with its resource allocation, where the resource allocation modification may include using one or more of a modified parameter or a modified grant. The use of the one or more of a modified parameter or a modified grant may be performed, e.g., by the modified grant or parameter process component 1942 of the apparatus 1902 in FIG. 19.

For example, in response to determining the first channel allocation will be punctured, the wireless device may modify a location of a DM-RS to a symbol that does not overlap the guard symbol or the second channel allocation, such as described in connection with FIG. 13. In some examples, the symbol location that does not overlap the guard symbol may be referred to as a non-overlapping symbol herein. In other words, the using the one or more of the modified parameter may include modifying a location of a DM-RS to a symbol that does not overlap the guard symbol or the second channel allocation. In other examples, in response to determining the first channel allocation will be punctured, the wireless device may modify a location of an ACK/NACK resource to a symbol that does not overlap the guard symbol or the second allocation, such as described in connection with FIG. 14. In other words, the using the one or more of the modified parameter may include modifying a location of an ACK/NACK resource to a symbol that does not overlap the guard symbol or the second channel allocation.

In other examples, the first channel allocation may be a PUSCH or a PDSCH that overlaps with one or more guard symbols or the second channel allocation, and in response to determining the first channel allocation will be punctured, the wireless device may modify a redundancy version of the PUSCH or the PDSCH as described in connection with FIG. 15. In other words, the using the one or more of the modified parameter may include modifying a redundancy version of the PUSCH or the PDSCH. In some other examples, the first channel allocation may be a PUSCH or a PDSCH that overlaps with one or more guard symbols or the second channel allocation, and in response to determining the first channel allocation will be punctured, the wireless device may modify a transport block size of the PUSCH or the PDSCH. In other words, the using the one or more of the modified parameter may include modifying a transport block size of the PUSCH or the PDSCH. In such examples, the wireless device may exclude counting (e.g., may be configured not to count) overlapped symbols in resources elements used to calculate the transport block size of the PUSCH or the PDSCH. In other words, the wireless device may not, or may be configured not to, count overlapped symbols in resources elements used to calculate the transport block size of the PUSCH or the PDSCH. Thus, the wireless device may exclude the overlapped symbols from the resource elements used to calculate the transport block size of the PUSCH or the PDSCH.

In other examples, the wireless device may apply a first set of one or more parameters based on the overlap and applies a second set of one or more parameters when there is no overlap, such as described in connection with FIG. 15. In such examples, the wireless device may apply a same rule as its parent IAB node applies to determine the overlap or to determine the modified parameter or the modified grant as shown in connection with FIGS. 14 and 15.

For example, at 1806, the wireless device (e.g., the IAB node) may receive a configuration of the first set of one or more parameters and the second set of one or more parameters from its parent device, such as described in connection with FIG. 15. The configuration may be received in RRC signaling or a MAC-CE. The reception of the configuration may be performed, e.g., by the parameter configuration component 1944 and/or the reception component 1930 of the apparatus 1902 in FIG. 19.

At 1807, the wireless device (or the IAB node) may also transmit a configuration of the first set of one or more parameters and the second set of one or more parameters to its child device. Similarly, the configuration may be transmitted in RRC signaling or a MAC-CE. The transmission of the configuration may be performed, e.g., by the parameter configuration component 1944 and/or the transmission component 1934 of the apparatus 1902 in FIG. 19.

In some examples, the first channel allocation may be based on a semi-static allocation or a previous dynamic allocation from a parent device, and the second channel allocation may be for a child device, and the wireless device (e.g., the IAB-node) may further receive the modified grant from a parent node that replaces the first channel allocation based on the overlap, such as described in connection with FIG. 16.

In another example, the first channel allocation may be based on a semi-static allocation or a previous dynamic allocation for a child device, and the second channel allocation may be from a parent device. The wireless device (e.g., the IAB-node) may transmit the modified grant to the child device that replaces the second channel allocation based on the overlap.

At 1808, the wireless device (e.g., the IAB-node) may use multiple hypotheses to receive communication based on the first channel allocation, where a first hypothesis may be based at least in part on an unmodified allocation and a second hypothesis may be based at least in part on a modified allocation, such as described in connection with FIG. 17. The use of the multiple hypotheses to receive communication may be performed, e.g., by the hypothesis component 1946 and/or the reception component 1930 of the apparatus 1902 in FIG. 19.

Figure 19:
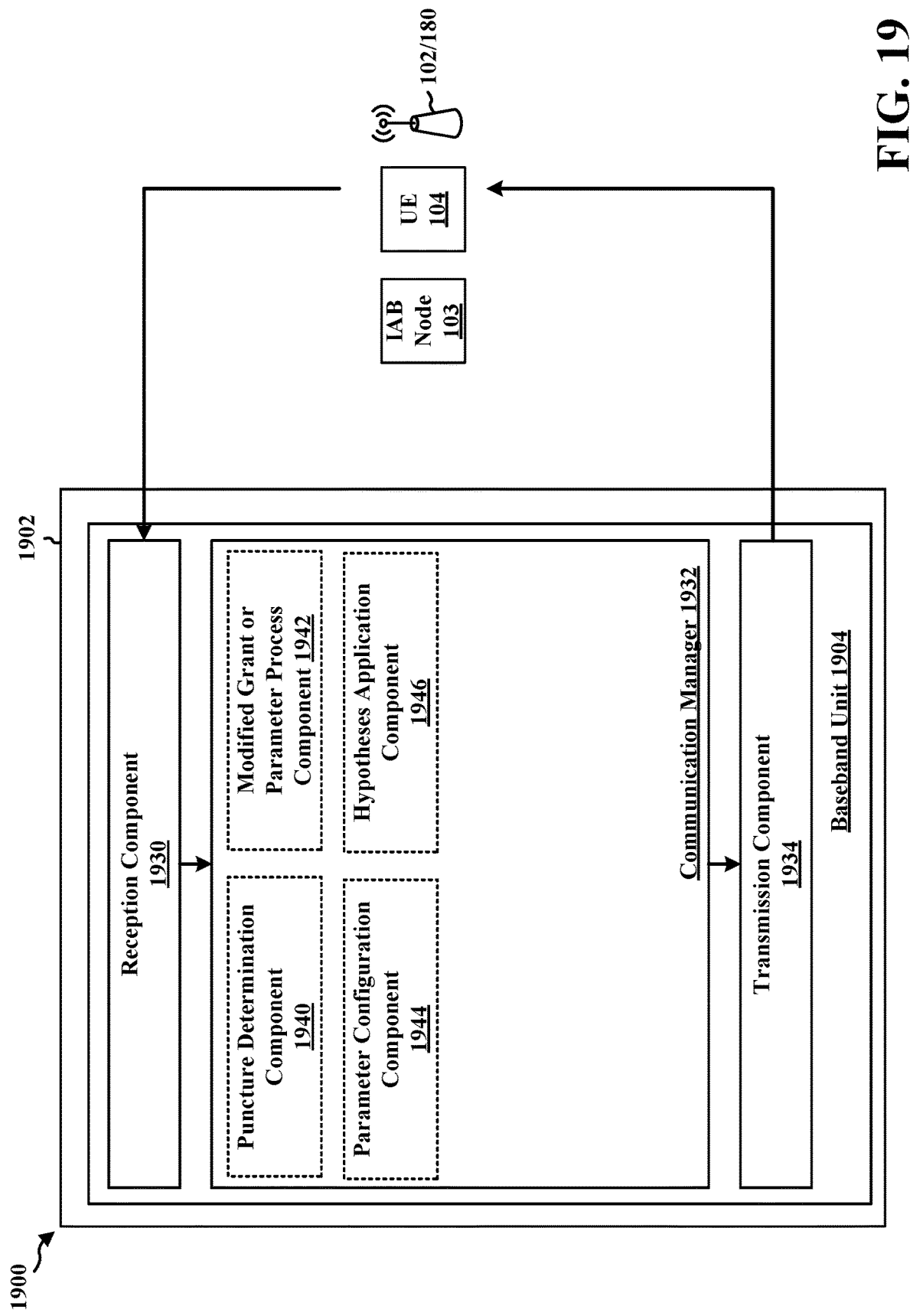
FIG. 19 is a diagram illustrating an example of a hardware implementation for an example apparatus in accordance with aspects presented herein.

FIG. 19 is a diagram 1900 illustrating an example of a hardware implementation for an apparatus 1902. The apparatus 1902 is a BS and includes a baseband unit 1904. The baseband unit 1904 may communicate through a cellular RF transceiver with the UE 104. The baseband unit 1904 may include a computer-readable medium/memory. The baseband unit 1904 is responsible for general processing, including the execution of software stored on the computer-readable medium/memory. The software, when executed by the baseband unit 1904, causes the baseband unit 1904 to perform the various functions described supra. The computer-readable medium/memory may also be used for storing data that is manipulated by the baseband unit 1904 when executing software. The baseband unit 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the baseband unit 1904. The baseband unit 1904 may be a component of the device 310 and may include the memory 376 and/or at least one of the TX processor 316, the RX processor 370, and the controller/processor 375.

The communication manager 1932 includes a puncture determination component 1940 that is configured to determine a first channel allocation will be punctured based at least in part on an overlap of the first channel allocation with at least one of a guard symbol or a second channel allocation, e.g., as described in connection with 1802 of FIG. 18. The communication manager 1932 further includes a modified grant or parameter process component 1942 that is configured to use, for the first channel allocation, one or more of a modified parameter or a modified grant in response to determining the first channel allocation will be punctured, e.g., as described in connection with 1804 of FIG. 18. The communication manager 1932 further includes a parameter configuration component 1944 that is configured to receive a configuration of the first set of one or more parameters and the second set of one or more parameters from its parent device, or to transmit a configuration of the first set of one or more parameters and the second set of one or more parameters to its child device, e.g., as described in connection with 1806 and 1807 of FIG. 18. The communication manager 1932 further includes a hypotheses component 1946 that is configured to use multiple hypotheses to receive communication based on the first channel allocation, where a first hypothesis may be based at least in part on an unmodified allocation and a second hypothesis may be based at least in part on a modified allocation, e.g., as described in connection with 1808 of FIG. 18.

The apparatus may include additional components that perform each of the blocks of the algorithm in the aforementioned flowchart of FIG. 18. As such, each block in the aforementioned flowchart of FIG. 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1902, and in particular the baseband unit 1904, includes means for determining a first channel allocation will be punctured based at least in part on an overlap of the first channel allocation with at least one of a guard symbol or a second channel allocation (e.g., the puncture determination component 1940). The apparatus 1902 includes means for using, for the first channel allocation, one or more of a modified parameter or a modified grant in response to determining the first channel allocation will be punctured (e.g., modified grant or parameter process component 1942). The apparatus 1902 includes means for receiving a configuration of the first set of one or more parameters and the second set of one or more parameters from its parent device, and/or means for transmitting a configuration of the first set of one or more parameters and the second set of one or more parameters to its child device (e.g., the parameter configuration component 1944, the transmission component 1934 and/or the reception component 1930). The apparatus 1902 includes means for using multiple hypotheses to receive communication based on the first channel allocation, where a first hypothesis may be based at least in part on an unmodified allocation and a second hypothesis may be based at least in part on a modified allocation (e.g., hypotheses component 1946 and/or the reception component 1930).

The aforementioned means may be one or more of the aforementioned components of the apparatus 1902 configured to perform the functions recited by the aforementioned means. As described supra, the apparatus 1902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 20:
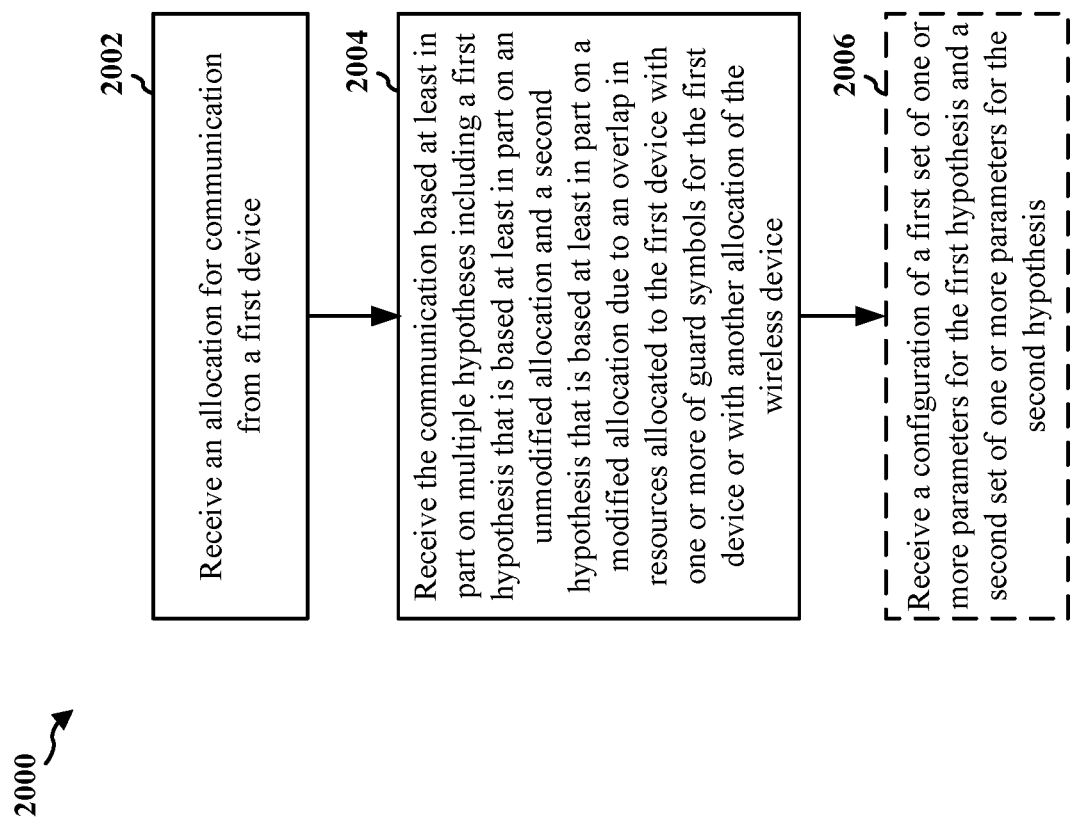
FIG. 20 is a flowchart of a method of wireless communication in accordance with aspects presented herein.

FIG. 20 is a flowchart 2000 of a method of wireless communication at a wireless device. The method may be performed by an IAB node, a base station or a component of a base station (e.g., the base station 102, 180; the device 310; the IAB node 410, 420, 510, 520a, 520b, 610, 620, 630, 702, 703, 705, 802, 803, 1002, 1003, 1102, 1103, 1202, 1203, 1402, 1403, 1502, 1503, 1602, 1603, 1702, 1703; the apparatus 2102; a processing system, which may include the memory 376 and which may be the entire device 310 or a component of the device 310, such as the TX processor 316, the RX processor 370, and/or the controller/processor 375). Optional aspects are illustrated with a dashed line. The method may enable an IAB node to receive a communication based at least in part on multiple hypotheses that include at least a first hypothesis that is based at least in part on an unmodified allocation and a second hypothesis that is based at least in part on a modified allocation associated with an overlap in resources allocated. Aspects of the method may improve communication between IAB nodes.

At 2002, the receiving IAB-node may receive an allocation for communication from a first device, such as described in connection with FIG. 17. For example, at 1708, the receiving IAB node 1703 may receive a resource allocation for communication from the transmitting IAB node 1702. The reception of the allocation may be performed, e.g., by the resource allocation process component 2140 and/or the reception component 2130 of the apparatus 2102 in FIG. 21. If the receiving IAB-node is a child IAB-node, the first device may comprise a parent IAB-node or a grand-child IAB-node. If the receiving IAB-node is a parent IAB-node, the first device may comprise a child IAB-node. If the receiving IAB-node is a grand-child IAB-node, the first device may comprise a child IAB-node.

At 2004, the receiving IAB-node may receive the communication based at least in part on multiple hypotheses including a first hypothesis that is based at least in part on an unmodified allocation and a second hypothesis that is based at least in part on a modified allocation associated with an overlap in resources allocated to the first device with one or more of guard symbols for the first device or with another allocation of the wireless device, such as described in connection with FIG. 17. For example, at 1723, the receiving IAB node 1703 may receive a communication from the transmitting IAB node 1702 based at least in part on applying different hypotheses associated with and without allocation modification to determine which hypotheses has a better transmission outcome, e.g., a best, transmission outcome among the different hypotheses. The reception of the communication based at least in part on multiple hypotheses may be performed, e.g., by the hypothesis application component 2142 and/or the reception component 2130 of the apparatus 2102 in FIG. 21. In some examples, the second hypothesis may include a modified symbol location of a DM-RS. In other examples, the second hypothesis may include a modified location of an ACK/NACK resource. In some other examples, the allocation may be for a PUSCH or a PDSCH, and the second hypothesis may be based at least in part on a modified redundancy version of the PUSCH or the PDSCH.

In some other examples, the first channel allocation may be for a PUSCH or a PDSCH and the second hypothesis may be based at least in part on a modified transport block size of the PUSCH or the PDSCH. In such examples, the overlapped symbols in resources elements may not be used to calculate the modified transport block size of the PUSCH or the PDSCH. For example, the overlapped symbols may be excluded from the resource elements used to calculate the modified transport block size of the PUSCH or the PDSCH.

At 2006, the receiving IAB-node may receive a configuration of a first set of one or more parameters for the first hypothesis and a second set of one or more parameters for the second hypothesis, such as shown in connection with FIG. 15. The configuration may be received in RRC signaling or MAC CE. The reception of the configuration may be performed, e.g., by the configuration process component 2144 and/or the reception component 2130 of the apparatus 2102 in FIG. 21.

FIG. 21 is a diagram 2100 illustrating an example of a hardware implementation for an apparatus 2102. The apparatus 2102 is a BS and includes a baseband unit 2104. The baseband unit 2104 may communicate through a cellular RF transceiver with the UE 104. The baseband unit 2104 may include a computer-readable medium/memory. The baseband unit 2104 is responsible for general processing, including the execution of software stored on the computer-readable medium/memory. The software, when executed by the baseband unit 2104, causes the baseband unit 2104 to perform the various functions described supra. The computer-readable medium/memory may also be used for storing data that is manipulated by the baseband unit 2104 when executing software. The baseband unit 2104 further includes a reception component 2130, a communication manager 2132, and a transmission component 2134. The communication manager 2132 includes the one or more illustrated components. The components within the communication manager 2132 may be stored in the computer-readable medium/memory and/or configured as hardware within the baseband unit 2104. The baseband unit 2104 may be a component of the device 310 and may include the memory 376 and/or at least one of the TX processor 316, the RX processor 370, and the controller/processor 375.

The communication manager 2132 includes a resource allocation process component 2140 that is configured to receive an allocation for communication from a first device, e.g., as described in connection with 2002 of FIG. 20. The communication manager 2132 further includes a hypotheses application component 2142 that is configured to receive the communication based at least in part on multiple hypotheses including a first hypothesis that is based at least in part on an unmodified allocation and a second hypothesis that is based at least in part on a modified allocation associated with an overlap in resources allocated to the first device with one or more of guard symbols for the first device or with another allocation of the wireless device, e.g., as described in connection with 2004 of FIG. 20. The communication manager 2132 further includes a configuration process component 2144 that is configured to receive a configuration of a first set of one or more parameters for the first hypothesis and a second set of one or more parameters for the second hypothesis, e.g., as described in connection with 2006 of FIG. 20.

The apparatus may include additional components that perform each of the blocks of the algorithm in the aforementioned flowchart of FIG. 18. As such, each block in the aforementioned flowchart of FIG. 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2102, and in particular the baseband unit 2104, includes means for receiving an allocation for communication from a first device (e.g., the resource allocation process component 2140 and/or the reception component 2130). The apparatus 2102 includes means for receiving the communication based at least in part on multiple hypotheses including a first hypothesis that is based at least in part on an unmodified allocation and a second hypothesis that is based at least in part on a modified allocation associated with an overlap in resources allocated to the first device with one or more of guard symbols for the first device or with another allocation of the wireless device (e.g., the hypotheses application component 2142 and/or the reception component 2130). The apparatus 2102 includes means for receiving a configuration of a first set of one or more parameters for the first hypothesis and a second set of one or more parameters for the second hypothesis (e.g., the configuration process component 2144 and/or the reception component 2130).

The aforementioned means may be one or more of the aforementioned components of the apparatus 2102 configured to perform the functions recited by the aforementioned means. As described supra, the apparatus 2102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following examples set forth additional aspects and are illustrative only and aspects thereof may be combined with aspects of other examples or teaching described herein, without limitation.

Aspect 1 is a method of wireless communication at a wireless device, comprising: determining a first channel allocation will be punctured based at least in part on an overlap of the first channel allocation with at least one of a guard symbol or a second channel allocation; and using, for the first channel allocation, one or more of a modified parameter or a modified grant in response to determining the first channel allocation will be punctured.

In aspect 2, the method of aspect 1 further includes that the first channel allocation is from a parent device of the wireless device to the wireless device and the second channel allocation is from the wireless device to a child device of the wireless device.

In aspect 3, the method of aspect 1 or aspect 2 further includes that the first channel allocation is from the wireless device to a child device of the wireless device and the second channel allocation is from a parent device of the wireless device to the wireless device.

In aspect 4, the method of any of aspects 1-3 further includes that the using the one or more of the modified parameter further comprises: modifying a location of a DM-RS to a symbol that does not overlap the guard symbol or the second channel allocation.

In aspect 5, the method of any of aspects 1-4 further includes that the using the one or more of the modified parameter further comprises: modifying a location of an ACK/NACK resource to a symbol that does not overlap the guard symbol or the second channel allocation.

In aspect 6, the method of any of aspects 1-5 further includes that the first channel allocation is for a PUSCH or a PDSCH that overlaps with one or more guard symbols or the second channel allocation, and wherein the using the one or more of the modified parameter further comprises: modifying a redundancy version of the PUSCH or the PDSCH.

In aspect 7, the method of any of aspects 1-6 further includes that the first channel allocation is for a PUSCH or a physical downlink shared channel (PDSCH) that overlaps with one or more guard symbols or the second channel allocation, and wherein the using the one or more of the modified parameter further comprises: modifying a transport block size of the PUSCH or the PDSCH.

In aspect 8, the method of any of aspects 1-7 further includes that the wireless device excludes counting (or is configured not to count) overlapped symbols in resources elements used to calculate the transport block size of the PUSCH or the PDSCH.

In aspect 9, the method of any of aspects 1-8 further includes that the wireless device applies a first set of one or more parameters based on the overlap and applies a second set of one or more parameters when there is no overlap.

In aspect 10, the method of any of aspects 1-9 further comprises receiving a configuration of the first set of one or more parameters and the second set of one or more parameters from the parent device.

In aspect 11, the method of any of aspects 1-10 further includes that the configuration is received in radio resource control (RRC) signaling or a medium access control-control element (MAC-CE).

In aspect 12, the method of any of aspects 1-11 further comprises: transmitting a configuration of the first set of one or more parameters and the second set of one or more parameters to the child device.

In aspect 13, the method of any of aspects 1-12 further includes that the configuration is transmitted in radio resource control (RRC) signaling or a medium access control-control element (MAC-CE).

In aspect 14, the method of any of aspects 1-13, wherein the first channel allocation is based on a semi-static allocation or a previous dynamic allocation from a parent device and the second channel allocation is for a child device, the method further comprises: receiving the modified grant from a parent node that replaces the first channel allocation based on the overlap.

In aspect 15, the method of any of aspects 1-14, wherein the first channel allocation is based on a semi-static allocation or a previous dynamic allocation for a child device and the second channel allocation is from a parent device, the method further comprises: transmitting the modified grant to the child device that replaces the second channel allocation based on the overlap.

In aspect 16, the method of any of aspects 1-15 further includes that the wireless device comprises an integrated access and backhaul (IAB) node.

In aspect 17, the method of any of aspects 1-16 further includes that the first channel allocation is for first communication with a parent node of the IAB node using a mobile termination (MT) function of the IAB node, and the second channel allocation is for second communication with a child node of the IAB node using a distributed unit (DU) function of the IAB node.

In aspect 18, the method of any of aspects 1-17 further includes that the first channel allocation is for first communication with a child node of the IAB node using a distributed unit (DU) function of the IAB node, and the second channel allocation is for second communication with a parent node of the IAB node using a mobile termination (MT) function of the IAB node.

In aspect 19, the method of any of aspects 1-18 further includes that the wireless device uses a same rule as its parent IAB node to determine the overlap or to determine the modified parameter or the modified grant.

In aspect 20, the method of any of aspects 1-19 further comprises: using multiple hypotheses to receive communication based on the first channel allocation, wherein a first hypothesis is based at least in part on an unmodified allocation and a second hypothesis is based at least in part on a modified allocation.

Aspect 21 is an apparatus for wireless communication at a wireless device, comprising: means for determining a first channel allocation will be punctured based at least in part on an overlap of the first channel allocation with at least one of a guard symbol or a second channel allocation; and means for using, for the first channel allocation, one or more of a modified parameter or a modified grant in response to determining the first channel allocation will be punctured.

In aspect 22, the apparatus of aspect 21 further comprises means to perform the method of any of aspects 2-20.

Aspect 23 is an apparatus for wireless communication including at least one processor coupled to a memory and configured to implement a method as in any of aspects 1-20.

Aspect 24 is a non-transitory computer-readable medium storing computer executable code, where the code when executed by a processor causes the processor to implement a method as in any of aspects 1-20.

Aspect 25 is a method of wireless communication at a wireless device, comprising: receiving an allocation for communication from a first device; and receiving the communication based at least in part on multiple hypotheses including a first hypothesis that is based at least in part on an unmodified allocation and a second hypothesis that is based at least in part on a modified allocation associated with an overlap in resources allocated to the first device with one or more of guard symbols for the first device or with another allocation of the wireless device.

In aspect 26, the method of aspect 25 further includes that the wireless device comprises an IAB node In aspect 27, the method of aspect 25 or aspect 26 further includes that the first device comprises a parent node of the wireless device.

In aspect 28, the method of any of aspects 25-27 further includes that the first device comprises a child node of the wireless device.

In aspect 29, the method of any of aspects 25-28 further includes that the second hypothesis includes a modified symbol location of a DM-RS.

In aspect 30, the method of any of aspects 25-29 further includes that the second hypothesis includes a modified location of an ACK/NACK resource.

In aspect 31, the method of any of aspects 25-30 further includes that the allocation is for a PUSCH or a PDSCH, and wherein the second hypothesis is based at least in part on a modified redundancy version of the PUSCH or the PDSCH.

In aspect 32, the method of any of aspects 25-31 further includes that the first channel allocation is for a PUSCH or a PDSCH and the second hypothesis is based at least in part on a modified transport block size of the PUSCH or the PDSCH.

In aspect 33, the method of any of aspects 25-32 further includes that overlapped symbols in resources elements are not used to calculate the modified transport block size of the PUSCH or the PDSCH.

In aspect 34, the method of any of aspects 25-33 further comprises: receiving a configuration of a first set of one or more parameters for the first hypothesis and a second set of one or more parameters for the second hypothesis.

In aspect 35, the method of any of aspects 25-34 further includes that the configuration is received in RRC signaling or a MAC-CE.

Aspect 36 is an apparatus for wireless communication at a wireless device, comprising: means for receiving an allocation for communication from a first device; and means for receiving the communication based at least in part on multiple hypotheses including a first hypothesis that is based at least in part on an unmodified allocation and a second hypothesis that is based at least in part on a modified allocation associated with an overlap in resources allocated to the first device with one or more of guard symbols for the first device or with another allocation of the wireless device.

In aspect 37, the apparatus of aspect 38 further comprises means to perform the method of any of claims 26-35.

Aspect 38 is an apparatus for wireless communication including at least one processor coupled to a memory and configured to implement a method as in any of aspects 25-35.

Aspect 39 is a non-transitory computer-readable medium storing computer executable code, where the code when executed by a processor causes the processor to implement a method as in any of aspects 25-35.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a wireless device, comprising:

transmitting or receiving a set of rules to apply when a channel allocation is punctured due to overlapping of one or more resources, wherein the set of rules includes using one or more of at least one modified resource allocation or a modified grant;

determining a first channel allocation will be punctured based on an overlap of the first channel allocation with at least one of a guard symbol or a second channel allocation, wherein the first channel allocation is from a parent device of the wireless device to the wireless device and the second channel allocation is from the wireless device to a child device of the wireless device, or wherein the first channel allocation is from the wireless device to the child device of the wireless device and the second channel allocation is from the parent device of the wireless device to the wireless device; and using, for the first channel allocation, one or more of the at least one modified resource allocation or the modified grant for communication, in response to determining the first channel allocation will be punctured and based on the set of rules.

2. The method of claim 1, wherein the first channel allocation is from the parent device of the wireless device to the wireless device and the second channel allocation is from the wireless device to the child device of the wireless device.

3. The method of claim 1, wherein the first channel allocation is from the wireless device to the child device of the wireless device and the second channel allocation is from the parent device of the wireless device to the wireless device.

4. The method of claim 1, wherein the method includes using the at least one modified resource allocation for the communication, comprising:

modifying a location of a demodulation reference signal (DM-RS) to a symbol that does not overlap the guard symbol or the second channel allocation.

5. The method of claim 1, wherein the method includes using the at least one modified resource allocation for the communication, comprising:

modifying a location of one of an acknowledgement (ACK) resource or a negative acknowledgment (NACK) resource to a symbol that does not overlap the guard symbol or the second channel allocation.

6. The method of claim 1, wherein the first channel allocation is for a physical uplink shared channel (PUSCH) or a physical downlink shared channel (PDSCH) that overlaps with one of one or more guard symbols or the second channel allocation, and
wherein the method includes using the at least one modified resource allocation for the communication, comprising: modifying a redundancy version of the PUSCH or the PDSCH.

7. The method of claim 1, wherein the first channel allocation is for a physical uplink shared channel (PUSCH) or a physical downlink shared channel (PDSCH) that overlaps with one or more guard symbols or the second channel allocation, and
wherein the method includes using the at least one modified resource allocation for the communication, comprising: modifying a transport block size of the PUSCH or the PDSCH.

8. The method of claim 7, wherein the wireless device excludes counting overlapped symbols in resource elements used to calculate the transport block size of the PUSCH or the PDSCH.

9. The method of claim 1, wherein the wireless device applies a first set of allocations based on the overlap of the first channel allocation with at least one of the guard symbol or the second channel allocation that is different from a second set of allocations when the first channel allocation does not overlap with the guard symbol and the second channel allocation.

10. The method of claim 9, further comprising:
receiving a configuration of at least one of the first set of allocations or the second set of allocations from the parent device.

11. The method of claim 10, wherein the configuration is received in radio resource control (RRC) signaling or a medium access control-control element (MAC-CE).

12. The method of claim 9, further comprising:
transmitting a configuration of the first set of allocations and the second set of allocations to the child device.

13. The method of claim 12, wherein the configuration is transmitted in radio resource control (RRC) signaling or a medium access control-control element (MAC-CE).

14. The method of claim 1, wherein the first channel allocation is based on a semi-static allocation or a previous dynamic allocation from the parent device and the second channel allocation is for the child device, and wherein the method includes using the modified grant for the communication, the method further comprising:
receiving, from a parent node, the modified grant replacing the first channel allocation based on the overlap.

15. The method of claim 1, wherein the first channel allocation is based on a semi-static allocation or a previous dynamic allocation for the child device and the second channel allocation is from the parent device, and wherein the method includes using the modified grant for the communication, the method further comprising:
transmitting, to the child device, the modified grant replacing the second channel allocation based on the overlap.

16. The method of claim 1, wherein the wireless device comprises an integrated access and backhaul (IAB) node.

17. The method of claim 16, wherein the first channel allocation is for a first communication with a parent node of the IAB node using a mobile termination (MT) function of the IAB node, and the second channel allocation is for a second communication with a child node of the IAB node using a distributed unit (DU) function of the IAB node.

18. The method of claim 16, wherein the first channel allocation is for a first communication with a child node of the IAB node using a distributed unit (DU) function of the IAB node, and the second channel allocation is for a second communication with a parent node of the IAB node using a mobile termination (MT) function of the IAB node.

19. The method of claim 16, wherein the wireless device uses a same rule as a parent IAB node to determine the overlap or to determine the at least one modified resource allocation or the modified grant.

20. The method of claim 1, further comprising:
using multiple hypotheses to receive the communication based on the first channel allocation, wherein a first hypothesis is based on an unmodified allocation and a second hypothesis is based on a modified allocation.

21. The method of claim 1, wherein the determining the first channel allocation will be punctured based on the overlap of the first channel allocation with at least one of the guard symbol or the second channel allocation comprises:
identifying the first channel allocation overlaps with the guard symbol or the second channel allocation; and
discarding at least a portion of resources of the first channel allocation that overlap with the guard symbol or the second channel allocation.

22. The method of claim 1, wherein the at least one modified resource allocation is used for the first channel allocation in response to determining the first channel allocation will be punctured.

23. The method of claim 1, wherein the modified grant is used for the first channel allocation in response to determining the first channel allocation will be punctured.

24. The method of claim 1, wherein the set of rules includes using the at least one modified resource allocation and the modified grant, and wherein using the one or more of the at least one modified resource allocation or the modified grant comprises using the at least one modified resource allocation and the modified grant.

25. The method of claim 1, wherein the set of rules includes using at least one modified grant, and wherein using the one or more of the at least one modified resource allocation or the modified grant comprises using the at least one modified grant.

26. The method of claim 1, wherein the method includes transmitting the set of rules to apply when the channel allocation is punctured.

27. The method of claim 1, wherein the method includes receiving the set of rules to apply when the channel allocation is punctured.

28. The method of claim 1, wherein the method includes using the one or more of the at least one modified resource allocation or the modified grant for the communication in response to determining the first channel allocation will be punctured based on the overlap of the first channel allocation with the guard symbol.

29. The method of claim 1, wherein the method includes using the one or more of the at least one modified resource allocation or the modified grant for the communication in response to determining the first channel allocation will be punctured based on the overlap of the first channel allocation with the second channel allocation.

30. An apparatus for wireless communication at a wireless device, comprising:
memory; and one or more processors coupled to the memory and configured to cause the wireless device to:
transmit or receive a set of rules to apply when a channel allocation is punctured due to overlapping of one or more resources, wherein the set of rules includes use of one or more of at least one modified resource allocation or a modified grant;
determine a first channel allocation will be punctured based on an overlap of the first channel allocation with at least one of a guard symbol or a second channel allocation, wherein the first channel allocation is from a parent device of the wireless device to the wireless device and the second channel allocation is from the wireless device to a child device of the wireless device, or wherein the first channel allocation is from the wireless device to the child device of the wireless device and the second channel allocation is from the parent device of the wireless device to the wireless device; and
use, for the first channel allocation, one or more of the at least one modified resource allocation or the modified grant for communication, in response to a determination that the first channel allocation will be punctured and based on the set of rules.

31. The apparatus of claim 30, wherein to use the at least one modified resource allocation the one or more processors are configured to cause the wireless device to:
modify a location of a demodulation reference signal (DM-RS) or an acknowledgement/negative acknowledgment (ACK/NACK) to a symbol that does not overlap the guard symbol or the second channel allocation.

32. The apparatus of claim 30, wherein the first channel allocation is for a physical uplink shared channel (PUSCH) or a physical downlink shared channel (PDSCH) that overlaps with one or more guard symbols or the second channel allocation, and
wherein to use the one or more of the at least one modified resource allocation the one or more processors are configured to cause the wireless device to: modify a redundancy version or a transport block size of the PUSCH or the PDSCH.

33. The apparatus of claim 30, wherein the one or more processors are further configured to cause the wireless device to apply a first set of modified resource allocations based on the overlap and apply a second set of modified resource allocations when there is no overlap.

34. The apparatus of claim 30, wherein the one or more processors are further configured to cause the wireless device to:
receive a configuration of the first set of modified resource allocations and the second set of modified resource allocations from the parent device.

35. The apparatus of claim 30, wherein the one or more processors are further configured to cause the wireless device to:
transmit the configuration of the first set of modified resource allocations and the second set of modified resource allocations to the child device.

36. The apparatus of claim 30, wherein the first channel allocation is based on a semi-static allocation or a previous dynamic allocation from the parent device and the second channel allocation is for the child device, the one or more processors are further configured to cause the wireless device to:
receive the modified grant from a parent node that replaces the first channel allocation based on the overlap, or transmit the modified grant to the child device that replaces the second channel allocation based on the overlap.

37. The apparatus of claim 30, wherein to determine the first channel allocation will be punctured based on the overlap of the first channel allocation with at least one of the guard symbol or the second channel allocation, the one or more processors are configured to cause the wireless device to:
identify the first channel allocation overlaps with the guard symbol or the second channel allocation; and
discard at least a portion of resources of the first channel allocation that overlap with the guard symbol or the second channel allocation.

38. The apparatus of claim 30, wherein the one or more processors are configured to cause the wireless device to individually or in combination transmit or receive the set of rules, determine the first channel allocation will be punctured, and use the one or more of the at least one modified resource allocation or the modified grant.

39. The apparatus of claim 30, wherein the set of rules includes using the at least one modified resource allocation and the modified grant, and wherein to use the one or more of the at least one modified resource allocation or the modified grant the one or more processors are configured to cause the wireless device to use the at least one modified resource allocation and the modified grant.

40. The apparatus of claim 30, wherein the first channel allocation is from the parent device of the wireless device to the wireless device and the second channel allocation is from the wireless device to the child device of the wireless device.

41. The apparatus of claim 30, wherein the first channel allocation is from the wireless device to the child device of the wireless device and the second channel allocation is from the parent device of the wireless device to the wireless device.

42. The apparatus of claim 30, wherein the one or more processors are configured to cause the wireless device to transmit the set of rules to apply when the channel allocation is punctured.

43. The apparatus of claim 30, wherein the one or more processors are configured to cause the wireless device to receive the set of rules to apply when the channel allocation is punctured.

44. The apparatus of claim 30, wherein the one or more processors are configured to cause the wireless device to use the one or more of the at least one modified resource allocation or the modified grant for the communication in response to the determination that the first channel allocation will be punctured based on the overlap of the first channel allocation with the guard symbol.

45. The apparatus of claim 30, wherein the one or more processors are configured to cause the wireless device to use the one or more of the at least one modified resource allocation or the modified grant for the communication in response to the determination that the first channel allocation will be punctured based on the overlap of the first channel allocation with the second channel allocation.

46. A non-transitory computer-readable storage medium storing computer executable code at a wireless device, the code when executed by one or more processors causes the wireless device to:
transmit or receive a set of rules to apply when a channel allocation is punctured due to overlapping of one or more resources, wherein the set of rules includes use of one or more of one modified resource allocation or a modified grant;

determine a first channel allocation will be punctured based on an overlap of the first channel allocation with at least one of a guard symbol or a second channel allocation, wherein the first channel allocation is from a parent device of the wireless device to the wireless device and the second channel allocation is from the wireless device to a child device of the wireless device, or wherein the first channel allocation is from the wireless device to the child device of the wireless device and the second channel allocation is from the parent device of the wireless device to the wireless device; and use, for the first channel allocation, one or more of the at least one modified resource allocation or the modified grant for communication, in response to a determination that the first channel allocation will be punctured and based on the set of rules.

47. The non-transitory computer-readable storage medium of claim 46, wherein to use the one modified resource allocation, the code when executed by the one or more processors causes the wireless device to:

modify a location of one of a demodulation reference signal (DM-RS), an acknowledgement (ACK) resource, or a negative acknowledgment (NACK) resource to a symbol that does not overlap the guard symbol or the second channel allocation.

48. The non-transitory computer-readable storage medium of claim 46, wherein the first channel allocation is for a physical uplink shared channel (PUSCH) or a physical downlink shared channel (PDSCH) that overlaps with one of one or more guard symbols or the second channel allocation, and wherein to use the at least one modified resource allocation, the code when executed by the one or more processors causes the wireless device to: modify a redundancy version or a transport block size of the PUSCH or the PDSCH.

49. The non-transitory computer-readable storage medium of claim 46, wherein to determine the first channel allocation will be punctured based on the overlap of the first channel allocation with at least one of the guard symbol or the second channel allocation, the code when executed by the one or more processors cause the wireless device to:

identify the first channel allocation overlaps with the guard symbol or the second channel allocation; and discard at least a portion of resources of the first channel allocation that overlap the guard symbol or the second channel allocation.

50. The non-transitory computer-readable storage medium of claim 46, wherein the first channel allocation is from the parent device of the wireless device to the wireless device and the second channel allocation is from the wireless device to the child device of the wireless device.

51. The non-transitory computer-readable storage medium of claim 46, wherein the first channel allocation is from the wireless device to the child device of the wireless device and the second channel allocation is from the parent device of the wireless device to the wireless device.

52. The non-transitory computer-readable storage medium of claim 46, wherein the code, when executed by the one or more processors, causes the wireless device to transmit the set of rules to apply when the channel allocation is punctured.

53. The non-transitory computer-readable storage medium of claim 46, wherein the code, when executed by the one or more processors, causes the wireless device to receive the set of rules to apply when the channel allocation is punctured.

54. The non-transitory computer-readable storage medium of claim 46, wherein the code, when executed by the one or more processors, causes the wireless device to use the one or more of the at least one modified resource allocation or the modified grant for the communication in response to the determination that the first channel allocation will be punctured based on the overlap of the first channel allocation with the guard symbol.

55. The non-transitory computer-readable storage medium of claim 46, wherein the code, when executed by the one or more processors, causes the wireless device to use the one or more of the at least one modified resource allocation or the modified grant for the communication in response to the determination that the first channel allocation will be punctured based on the overlap of the first channel allocation with the second channel allocation.

56. The non-transitory computer-readable storage medium of claim 46, wherein the first channel allocation is based on a semi-static allocation or a previous dynamic allocation from the parent device and the second channel allocation is for the child device, and wherein the code, when executed by the one or more processors, causes the wireless device to:

receive the modified grant from a parent node that replaces the first channel allocation based on the overlap, or transmit the modified grant to the child device that replaces the second channel allocation based on the overlap.

\* \* \* \* \*